(12) United States Patent
Smith

(10) Patent No.: US 7,346,134 B2
(45) Date of Patent: Mar. 18, 2008

(54) RADIO RECEIVER

(75) Inventor: Francis J. Smith, Livermore, CA (US)

(73) Assignee: Finesse Wireless, Inc., Livermore, CA (US)

( * ) Notice: Subject to any disclaimer, the term of this patent is extended or adjusted under 35 U.S.C. 154(b) by 933 days.

(21) Appl. No.: 10/146,358

(22) Filed: May 14, 2002

(65) Prior Publication Data

US 2003/0021367 A1    Jan. 30, 2003

Related U.S. Application Data

(60) Provisional application No. 60/328,125, filed on Oct. 9, 2001, provisional application No. 60/311,942, filed on Aug. 13, 2001, provisional application No. 60/309,602, filed on Aug. 3, 2001, provisional application No. 60/290,781, filed on May 15, 2001.

(51) Int. Cl.
  *H03D 1/04*    (2006.01)
(52) U.S. Cl. .................................... 375/346; 375/350
(58) Field of Classification Search ............ 375/346, 375/284, 285, 350, 316, 348, 349; 455/63.1, 455/501, 296
See application file for complete search history.

(56) References Cited

U.S. PATENT DOCUMENTS

| | | | | |
|---|---|---|---|---|
| 5,565,930 A | * | 10/1996 | Bolger et al. ............... | 348/572 |
| 5,625,359 A | * | 4/1997 | Wilson et al. .............. | 341/143 |
| 5,745,839 A | * | 4/1998 | Lieberman ................... | 455/10 |
| 5,782,666 A | * | 7/1998 | Bardi et al. .................... | 445/73 |
| 5,963,160 A | | 10/1999 | Wilson et al. | |
| 5,999,574 A | * | 12/1999 | Sun et al. .................... | 375/326 |
| 6,118,499 A | | 9/2000 | Fang | |
| 6,160,859 A | | 12/2000 | Martin et al. | |
| 6,204,793 B1 | * | 3/2001 | Cheng ........................ | 341/155 |
| 6,215,812 B1 | * | 4/2001 | Young et al. ............... | 375/144 |
| 6,240,124 B1 | * | 5/2001 | Wiedeman et al. ......... | 375/130 |
| 6,243,430 B1 | * | 6/2001 | Mathe ......................... | 375/346 |
| 6,389,069 B1 | * | 5/2002 | Mathe ......................... | 375/232 |
| 6,477,196 B1 | * | 11/2002 | Swanke et al. ............. | 375/147 |
| 6,498,926 B1 | * | 12/2002 | Ciccarelli et al. ........ | 455/240.1 |
| 6,671,340 B1 | * | 12/2003 | Kroeger et al. ............. | 375/350 |
| 6,704,349 B1 | * | 3/2004 | Masenten .................... | 375/219 |
| 6,807,405 B1 | * | 10/2004 | Jagger et al. ............... | 455/296 |
| 6,975,673 B1 | * | 12/2005 | Rouquette .................... | 375/149 |
| 7,092,676 B2 | * | 8/2006 | Abdelgany et al. ........... | 455/76 |
| 7,151,759 B1 | * | 12/2006 | Ryan et al. ................. | 370/332 |

(Continued)

FOREIGN PATENT DOCUMENTS

JP    02262722 A   * 10/1990

*Primary Examiner*—Emmanuel Bayard
(74) *Attorney, Agent, or Firm*—Blakely, Sokoloff, Taylor & Zafman LLP

(57) ABSTRACT

Various apparatuses and methods are described to reduce interference in signals subject to intermodulation products and high power narrow band interfering signals on lower power wideband signals. Apparatuses and methods described herein also provide the capability for supporting multi-standards, multi-modes and multi-bands in wireless and wired applications with a single receiver or a receiver with minor variations. The receiver described herein samples the entire band in which there can be signals of interest or signals that can generate interference. All of these signals are sampled in one bit stream and the bit stream is processed to isolate signals of interest and interfering signals. The isolated interfering signals are then cancelled out of the signals of interest.

52 Claims, 14 Drawing Sheets

U.S. PATENT DOCUMENTS

2001/0033583 A1* 10/2001 Rabenko et al. ............ 370/503
2002/0012411 A1* 1/2002 Heinzl et al. ............... 375/350
2002/0105925 A1* 8/2002 Shoemake ................. 370/330
2002/0196771 A1* 12/2002 Vij et al. .................... 370/349
2003/0003959 A1* 1/2003 Tsui et al. .................. 455/561

* cited by examiner

RADIO RECEIVER

PRIORITY

The present patent application claims priority to the corresponding provisional patent application Ser. No. 60/290,781, titled,"Harmonically Compensated Software Radio Receiver HCSRR" filed on May 15, 2001, the corresponding provisional patent application Ser. No. 60/309,602, titled, "Harmonically Compensated Software Radio Receiver HCSRR with a Low IF" filed on Aug. 3, 2001, the corresponding provisional patent application Ser. No. 60/311,942, titled, "Harmonically Compensated Software Radio Receiver HCSRR With a Low IF" filed on Aug. 13, 2001, and the corresponding provisional patent application Ser. No. 60/328,125, titled, "Harmonically Compensated Software Radio Receiver HCSRR With a Low IF and a Non-linear Delta Modulated Transmitter" filed on Oct. 9, 2001.

FIELD OF THE INVENTION

The field of the invention relates to the field of radio receivers and nonlinear transmitters. More specifically, the invention relates to harmonically compensated radio receivers that demodulate multiple modulations and bandwidth signals and provide interference compensation.

BACKGROUND OF THE INVENTION

FIG. 1 illustrates a block diagram of a prior art wireless transmitter/receiver. Referring to FIG. 1, duplexer 100, in cooperation with an antennae, sends signals to a receiver 110 and will suffer transmitter feed thru in the duplexer from signals from a transmitter 120. During reception, duplexer 100 sends a signal of interest (SOI) (which is included in the entire receive band of the receiver) through a low noise amplifier (LNA) 130 and a surface acoustic wave (SAW) filter 140 to receiver 110. Receiver 110 uses a mixer 112 to mix a timing signal from a local oscillator (LO) 150 with the signal-of-interest (including the entire signal band pass as passed thru SAW filter 140) and down converting it to an IF, before demodulating the signal with a receiver processor 114. The demodulated signal is sent to a baseband processor 160 for further processing. During transmission, baseband processor 160 sends a signal to be transmitted to the transmitter device 120. Transmitter device 120 processes the signal with a transmitter processor 122, before using a mixer 124 to mix the signal with a signal from the local oscillator 150. The mixer 124 up converts the transmit signal to the desired RF transmit frequency. A high power amplifier (HPA) amplifies the signal, before being sent by duplexer 100 to the antenna for transmission over the air.

One of the common problems associated with wireless communications is unwanted signals intermixed with the information signal. These unwanted signals are referred to as interference. This interference can alter a radio frequency (RF) reception so that a receiver does not receive the information signal as intended.

To remove interference, filtering is often performed. The filtering may be performed in the analog or digital domain. In one commonly used technique, digital samples are low pass filtered to eliminate the higher harmonics above a baseband signal. However, this technique does not eliminate the interference due to the tails of the harmonic images that extend into the baseband signal.

SUMMARY OF THE INVENTION

A method and apparatus for processing signals is described. In one embodiment, the method comprises oversampling, at a desired frequency, a passband of received signals to create a bitstream. The received signals include signals of interest and interference generating signals. The interference generating signals capable of generating intermodulation products inband of the signals of interest. The method also includes isolating signals of interest in the bit stream using one or more decimating filters, isolating source signals that generate one or more intermodulation products inband of the signal of interest using one ore more decimating filters, computing an estimate of each of the one or more intermodulation products from the source signals that generate the one or more intermodulation products, and canceling out one or more inband intermodulation products using the estimate of the intermodulation products.

BRIEF DESCRIPTION OF THE DRAWINGS

The present invention is illustrated by way of example and is not limited in the figures of the accompanying drawings in which like references indicate similar elements and in which:

FIG. 2B illustrates a block diagram of an alternative embodiment of an intermodulation compensator.

Figure 1:
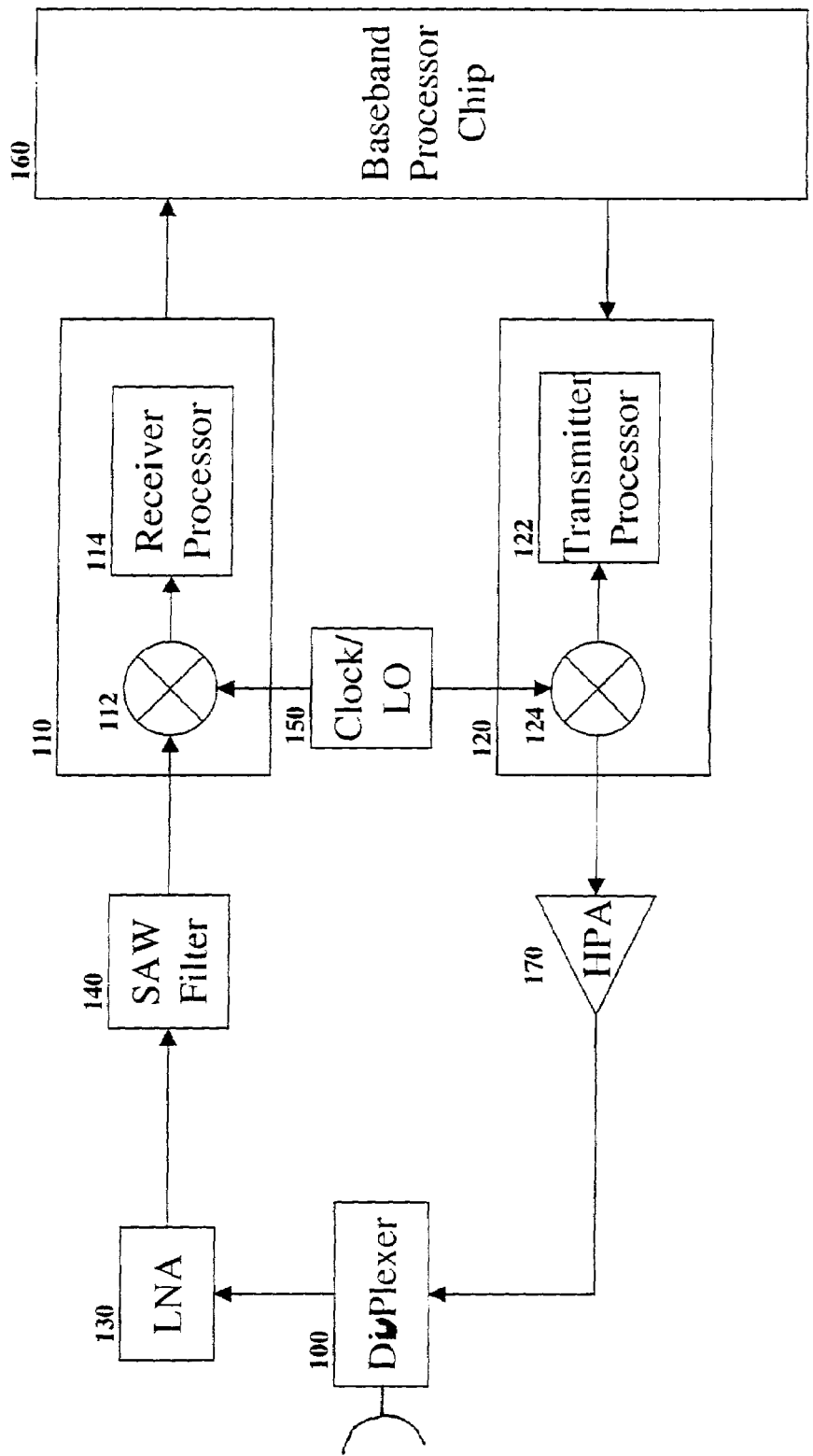
FIG. 1 illustrates a block diagram of a prior art wireless transmitter/receiver.

While the invention is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the invention.

DETAILED DESCRIPTION

This invention uses an over sampling technique known as a Sigma Delta Modulator, but uses it in a non-conventional way to achieve several benefits to be covered herein. (Note that in one embodiment a Flash A/D converter with sufficient resolution can be used, but will require a large dynamic range to accommodate very large jamming signals in the receive pass band and very high sampling speed to prevent aliasing). The full receive band, with the signal of interest (SOI) and all of the interfering signals and sources of intermodulation products, is processed by over-sampling the entire band at very low quantization, 1 or 2 bits. In one embodiment the transmitter feed thru is included in the band pass of the signal to be sampled by the Sigma Delta Modulator. In other embodiments, only the receive band is included. In the Sigma Delta Modulator, the sampling is done at a rate high enough to preclude aliasing of the signal (at a rate above the Nyquist rate). This provides a very low resolution digital sample of the passband. The 1 or 2 bit samples are input to several decimating filters associated with the Sigma Delta A/D converters simultaneously. These filters provide digital filtering for different signals of the receive band as well as performing the down sampling function in which the high sample rate of the Sigma Delta A/D is traded for a higher signal to noise ratio and greater quantization of a much more narrow band signal.

Figure 12A:
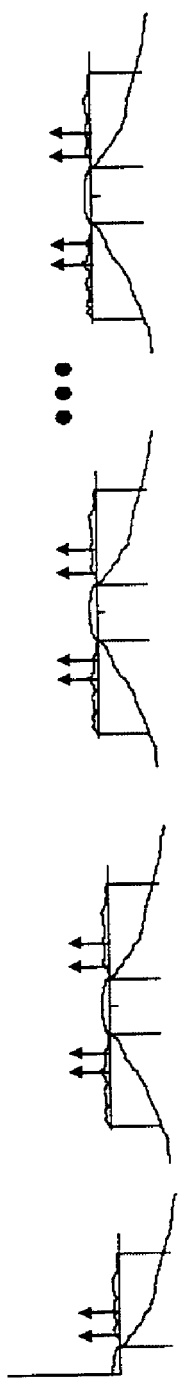
FIG. 12 illustrates the sampled images prior to band pass filtering.

The high speed over sampling with the Sigma Delta Modulator followed by the use of decimating filters two to produce two results. First, the filtering is done at a high sampling rate (see FIGS. 12A and B for example) and thus the images are farther apart and the power in the tails that is aliased in is much lower. Second, use of the Sigma Delta modulators followed by decimating filters allows for using the Sigma Delta A/D converter to process multiple different signals in the passband simultaneously. This keeps the signal synchronized and allows for the interference cancellations described in more detail below. It also provides for selectively using different decimating filters to process different types and modes of signals in the same band, such as, for example, CDMA, TDMA, AMP, GSM, WCDMA, etc. In one embodiment, using a single Sigma Delta or flash A/D converter to sample the entire passband and then following this with selectable decimating filters provides the capability to process multiple signals within the passband simultaneously allowing a single receiver to receive multiple signals simultaneously.

Figure 12B:
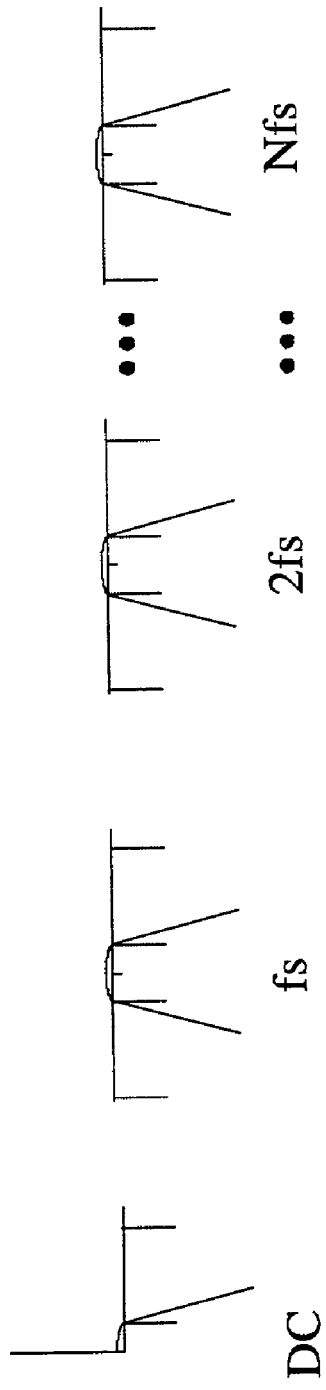

In FIG. 12, the sampled images prior to band pass filtering are shown. The sampling can be an exact harmonic of the final sampled carrier frequency (prior to output to a baseband processor or it can be selected to accommodate a near zero IF). If the sampling is not a even harmonic, the images will appear in different locations. In FIG. 12, the images are shown after band pass filtering. If the sampling rate fs is higher, the images are farther apart and the energy available to alias in to the desired image is less. The high rate, but low resolution sampling, of the Sigma Delta Modulator places these images at multiples of the high sampling rate fs. When these signals are bandpass filtered, there is little aliasing energy.

In the embodiment where in a flash A/D converter is used, the sampling rate required in the same as that of the Sigma Delta A/D only many bits are required for each sample instead of only 1 or 2. This may not be practical in cases where there are large interfering signals because the entire pass band is sampled and the sampling is done to a level of detail (number of bits) so that the signal of interest (SOI) can be distinguished from the interfering signals in the time domain. In cases where there are not large interfering signals and a large dynamic range is not required, a flash A/D converter may be used in place of the Sigma Delta. In this case, the A/D converter is followed by conventional digital filters to isolate the SOI and the interfering and source signals. Other attributes of this invention are the same for both of these embodiments (using a sigma delta and for using a flash A/D).

As is discussed below in one embodiment, a low resolution flash A/D may be used in conjunction with the sigma delta, but the low resolution flash A/D samples are only used for the energy search function and not the signal processing function. In another embodiment, the low resolution flash A/D converter samples are used to generate estimates of the intermodulation products that fall inband of the signal of interest.

The Harmonically Compensated Multi-Mode Radio Receiver uses a Sigma Delta over-sampling A/D converter in a non-traditional way. Note this is referred to herein as a Sigma Delta Modulator. The use of a Sigma Delta Modular is independent of the target RF (radio frequency) because for all applications, the desired receive passband is down converted to the same convenient intermediate frequency (IF). In different embodiments of this invention, some LO mixing frequencies and some of the filters are different to accommodate different RF frequencies and bands of interest. In one embodiment, this invention, a low resolution (1 or 2 bits; 1 bit will be used for discussion) Sigma Delta A/D converter in used to sample the entire receive pass band (to include relevant interfering signals and signals which can mix with other signals to produce intermodulation signals in the signal of interest (SOI) band). In alternative embodiments of this invention, the transmit feed thru band may also be included in the processed band to cancel interference in the receive band from the transmitter feed thru in full duplex operation.) This low resolution sampling is done at a sufficiently high enough rate to preclude aliasing (i.e. at a rate above the Nyquist rate for the entire receive band and transmit band if required).

In applications where a device is designed to process, "to be selected", bands within a receive band, the entire receive band is processed. Some examples include mobile telephony, CDMA, TDMA. AMPS, GSM and wireless LAN and PAN applications such at 802.11a and 802.11b and Bluetooth and others.

The high rate, low resolution, sampled passband digital signal is duplicated and input to several digital filters (of the Sigma Delta A/D Converter) simultaneously. In a prior art application of a Sigma Delta Converter, there is only one filter for the signal of interest (SOI). In the present invention, there are multiple filters that process the same high rate, low resolution samples. This provides for high resolution samples of narrow band selectable signals within the passband. Thereafter these narrow band signals are narrow band filtered and high resolution quantization is applied after the sigma delta decimating filters.

This selectivity of various signals with various bandwidths provides a number of benefits. First, the signal of interest (SOI) can be isolated from the interfering signals and the interfering signals and sources of interfering signals can be isolated from the SOI. With this isolation, the interfering signals can be processed and digitally subtracted from the SOI. If the interfering signals are narrowband and high power with respect to the SOI and inband, narrow filters can be placed around the interfering signals and the interfering signals can then be subtracted from the SOI. As described in more detail below, this is one solution for mitigating the Bluetooth interference on 802.11b. If the interfering signals are produced by the generation of intermodulation products that fall in band of the SOI, the source signals can be isolated and used to generate a copy of the SOI inband interfering intermodulation product and then it can be cancelled out. This is one solution for mitigating $3^{rd}$ order inter-mods in CDMA telephony and other applications.

Another key feature is that the digital filters used as the decimating filters in the Sigma Delta A/D converter can be programmed to isolate any signal in the passband. Since the passband may contain many signals for different standards and modes, the present invention can be implemented to select any mode or band desired within the passband thereby yielding a multimode multi-standard receiver with interference mitigation. Frequency hopped signals are accommodated by using programmable digital filters to pass the hopped signals in different portions of the receive pass band. This provides for a single receiver to process many telephony signals to include CDMA, TDMA, AMPS, GSM and 3G and others. The same receiver can process wireless LAN and 802.11a and 802.11b with Bluetooth. Note that all RF signals are down converted to a common IF. This invention will be able to process any signals in the passband. It will then support any standard baseband processor. Subject to the particular implementation, some or all of these and other standards may be supported.

While the description herein uses certain bandwidths and sampling rates, this invention may be used at any frequency and band pass required by implementing it in different technologies such as CMOS, BiCMOS, SiGe, GaAs and others.

The architecture described can support any signaling scheme. Based on the use of clocking speeds required, different technologies with different frequencies responses may be used. It is envisioned that as semiconductor technologies advance, the present invention may be used for higher frequencies and wider band widths.

The present invention provides for multi-band, multi-mode, multi-standard receivers with interference mitigation from intermodulation products and from high amplitude narrowband in-band interfering signals. This invention assumes that all signals in a given RF band are received from the same antenna and are processed in the same receive chain. No independent received chains or directional antennas are required, while these may provide some additional benefit.

The passband can be made wide enough to include the feed thru from the transmitter in the duplexer, and the transmit feed thru can be treated just like any other jamming or intermodulation source signal. In one embodiment, the receiver has a copy of the transmit signal after it has gone thru the transmitter high power amplifier (HPA) and this signal can be sent to the transmitter for calibrating at the non-linear pre-distortion in the transmitter. This predistortion pre-compensates for the amplitude to amplitude (AM/AM) and the amplitude to phase (AM/PM) non-linear distortion in the HPA. This is described in FIG. 3.

This invention is applicable to many communications systems to include wired and wireless. It can be used for satellite communications, fixed wireless, cable modems, DSL and many others.

The following are definitions of some of the terms used herein.

Signal of Interest (SOI)—with respect to the receiver, a signal that the receiver is trying to receive and send, in digital form, to the baseband processor.

Jammer Signal—any signal in the receive pass band that is not the intended signal of interest (SOI).

Interfering Signal—any unwanted signal that falls inband of the signal of interest (SOI)

Intermodulation or Intermodulation product—the signal that results from mixing of jammer signals in the non-linearities of the system that result in generating interfering signals in the pass band of the signal of interest (SOI).

Source Signals—Signals that mix in the non-linearities to produce intermodulation products that fall inband of the signal of interest (SOI).

IIP2 and IIP3—Input intercept points for $2^{nd}$ and $3^{rd}$ order products produced by mixing of jamming signals. The IIP2 and the IIP3 are measurements that predict the magnitude of the interfering signals.

Sigma Delta Modulator—A circuit that generates a low resolution high rate digital sample of a wave form Decimating Filter—A filter associated with the Sigma Delta Modulator or any digital down sampling filter. It provides narrow band filtering of the high speed, wide band, low resolution digital signal out of the sigma delta modulator and outputs a narrow band high resolution digital signal with many more bits of quantization. It may be a combination of multiple filters, but can be implemented as a FIR filter. It may be a multi-stage structure that filters and down samples in multiple steps. Decimating filters are used with conventional A/D converters, as well as sigma delta converters.

The receiver is not a classical direct conversion receiver, but it does have the advantages of direct conversion without the disadvantages. In one embodiment, there is only one LO and mixer and there is no IF SAW filter. The receiver takes in analog RF and outputs digital I and Q samples to the baseband processor for multiple standards. In other embodiments requiring extremely high dynamic range, the IF SAW filter may be included.

In the following description, numerous specific details are set forth, such as examples of specific signals, named components, connections, circuit layouts of intermodulation compensation components, etc., in order to provide a thorough understanding of the present invention. It will be apparent, however, to one skilled in the art that the present invention may be practiced without these specific details. In other instances, well known components or methods have not been described in detail but rather in a block diagram in order to avoid unnecessarily obscuring the present invention. The specific details set forth are merely exemplary. The specific details may be varied from and still be contemplated to be within the spirit and scope of the present invention.

In general, various apparatuses and methods are described to reduce interference in a signal of interest that is going to be subsequently digitally down-converted. In an embodiment, a radio receiver includes a sampling rate multiplier coupled to one or more decimating filters (e.g., impulse response filters). In an embodiment in which a flash A/D converter is used instead of a sigma delta A/D converter, these filters are conventional digital filters and may or may not be FIR filters. The sampling rate multiplier samples a signal at an intermediate frequency (IF) that is to be demodulated at a sampling rate that is significantly greater than the sampling rate of a subsequent digital down conversion. The over sampling ratio will be between 10 and 100 normally. The filters associated with the sigma delta converter are rather complex and there may be a number of filters embodied in the decimating filters. The filters are decimating filters (e.g., FIR filters) that provide both the narrowband filtering and the down sampling functions. Each impulse response filter filters digitally a signal of interest and down-samples the signal at the second sampling rate in order to reduce interference in a signal of interest prior to the final digital down conversion. The decimating filters also increase the SNR in the narrow band signal by trading the wideband high sample rate for a narrow band lower sample rate at a greater number of bits of quantization.

The radio receiver may also include intermodulation compensator to compensate for interference from non-linearities present in the system. The radio receiver may also include the capability to cancel high amplitude narrow band interfering signals from wideband low amplitude signals of interest.

Figure 2A:
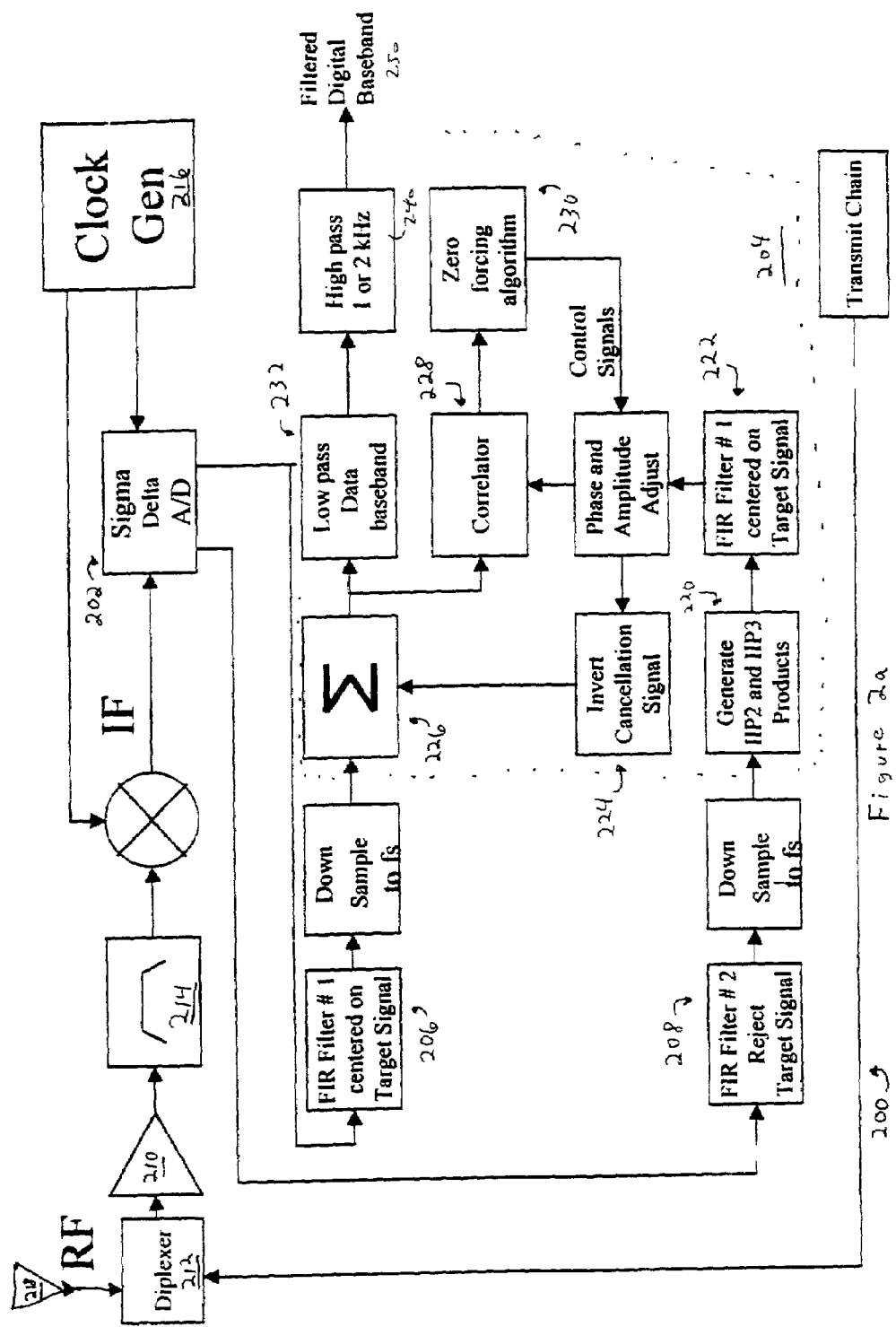
FIG. 2A illustrates a block diagram of an embodiment of a radio receiver that includes an intermodulation compensator.
Figure 9B:
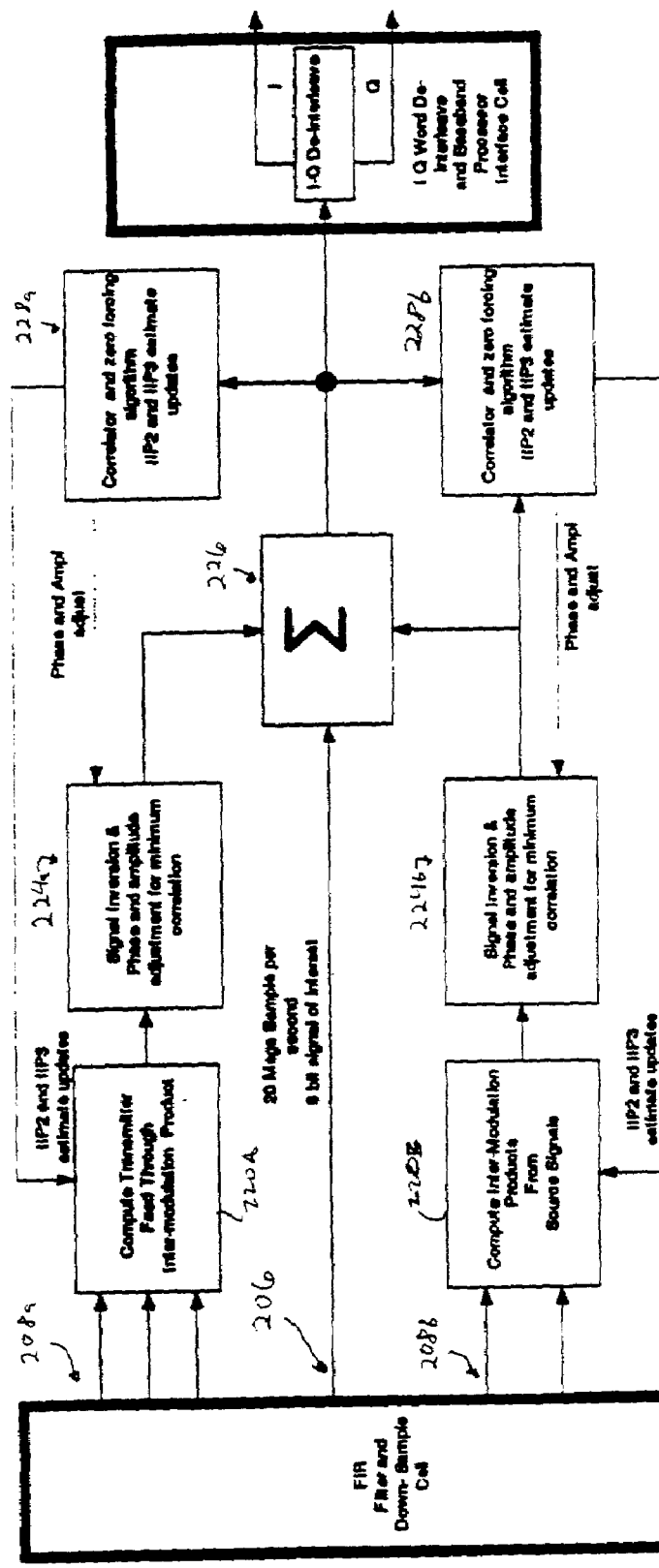
FIG. 9 illustrates a block diagram of one embodiment of a receiver that supports WLAN 802.11a and 802.11b and Bluetooth and provides mitigation of the interference of Bluetooth on 802.11b.

FIG. 2A illustrates a block diagram of one embodiment of a radio receiver. Referring to FIG. 2A, the receiver 200 includes sampling rate multiplier 202, intermodulation compensator 204, a finite impulse response (FIR) filter 206 and a second FR filter 208, a low noise amplifier (LNA) 210, a duplexer 212, a surface acoustic wave (SAW) filter 214, and a clock generator 216. In one embodiment, clock generator function 216 is a dual function element in that it generates the mixing signal for a down conversion mixer and the sampling clock for sampling rate multiplier 202. In one embodiment, sampling rate multiplier 202 may comprise a Sigma Delta A/D converter or other similar device. A Sigma Delta A/D converter has a high bandwidth and samples at a rate greater than the final digital down conversion. The filtering and the down-sampling are done in the decimating filters of the sigma delta converter. The decimating filters may be FIR filters or a combination of digital filters. In the sigma delta terminology, the function is called the decimating filters. In an embodiment, FIR filters 206 and 208 comprise other filters such as decimating filters. In an embodiment, clock generator 216 is a local oscillator and generates the sampling clock for a sigma delta modulator. In one embodiment, a high bandwidth signal consists of a input frequency bandwidth of 60 to 140 megaherz or greater. The LO for down convertion to the IF is selected based on the RF band of interest (example around 1300 MHz for PSC band 1900 MHz down converted to 600 MHz IF). In one embodiment, the clock signal for the sigma delta A/D converter is at least 2.5 times the bandwidth of the fitler 214. For a band width of 120 MHz, the sampling rate is around 350 MHz. Two factors contribute greatly to determining the sigma delta sampling rate. First, the sampling rate is high enough to preclude aliasing and second the over sampling ratio (OSR) is high enough to yield adequate signal to noise ratio (SNR) after the decimating filters. The OSR is the ratio of the sigma delta 1 bit sampling rate to the nyquist sampling rate of the signal after the decimating filter. In one embodiment, the OSR is at least between 8 and 16 for $2^{nd}$ or $3^{rd}$ order sigma delta loop. This yields a SNR of around 40 dB, which, in turn, yields 6 bits of resolution.

Note that in alternative embodiments the oversampling may be performed at baseband, RF, medium IF (e.g., at a frequency that is ½, ⅓, ¼ the difference between RF and baseband), or low IF (e.g., at a frequency that is less than five times the data bandwidth), as well as at IF.

In one embodiment, radio reciever 200 processes radio frequency (RF) signals received through antenna 218 with a convenient intermediate frequency. Receiver 200 samples the intermediate frequency with the low resolution (1 bit) sampling rate multiplier 202 and filters the digital samples with the one or more (decimating filters) FIR filters 206 and 208 as part of a subsequent digital down-conversion.

Radio receiver 200 also uses intermodulation compensator 204 to compensate for intermodulation products produced by the system non-linearities. Intermodulation compensator 204 estimates the non-linearities and intermodulation products prior to final digital conversion at baseband and output to the digital baseband processor(s) and uses these estimates to cancel out interference due to the non-linearities in the signal of interest (SOI).

Radio receiver 200 has two parts: 1) sampling rate multiplier 202 coupled one or more FIR filters 206 and 208 and 2) intermodulation compensator 204. In the first part, radio receiver 200 significantly reduces the interfering signals and noise in the signal receive band via the RF SAW filter. Demodulation at an intermediate frequency (IF) via a subsampling technique (subsampling downconversion and decimation filtering) provides close-in rejection of unwanted signals. The IF analog waveform is sampled at a high rate relative to the bandwidth of the SOI and then the SOI is filtered by the decimating filter which then yields a narrowband signal with a high SNR and greater quantization from 1 bit to 6 or 8 bits. The harmonics of the sampling function are spaced a multiples of the sampling rate and thus a high sampling rate places the harmonics far apart. When the decimating filter performs the filtering on these harmonics, the tails from undesired harmonics and close in interfering signals are eliminated or greatly reduced. This steep filtering is possible in the digital domain, but is not as easily done in the analog domain. If the image filtering were performed after the down sampling as in a conventional A/D converter, the images would be closer together and there would be a greater aliasing problem. The steep filtering of close in signals would most likely still be achievable given sufficient quantization.

In one embodiment, sampling rate multiplexer 202 comprises a Sigma Delta analog to digital (A/D) converter that takes digital samples of the waveform at the IF. Each of FIR filters 206 and 208 filters the digital data samples from the Sigma Delta A/D converter prior to a subsequent (and first) digital down-conversion. In one embodiment, down-sampling the Sigma Delta samples occurs at, typically at least 4 to 8 times the symbol rate of this subsequent digital down-conversion. Since each of FIR filters 206 and 208 may be a fractionally spaced FIR, the band-shape around the desired signal can be controlled very accurately. In one embodiment, Sigma Delta A/D converter 202 samples at a rate 5 to 10 or more times the rate of the final digital down sampling rate and with an OSR of 10 to 20 or more. Thus, the sampling images are 5 to 10 times or more times farther apart in the frequency domain. Since each of FIR filters 206 and 208 filters at the Sigma Delta rate, the aliasing tails are significantly reduced when aliased into the baseband as a result of the final digital down-sampling. FIR filters 206 and 208 provide an "effective" sharp filter on the radio-frequency signal, and each harmonic, that assists in reducing close-in jamming signals. Aliasing tails from the harmonics appear as unwanted high-frequency signals and if not for FIR filters 206 and 208 could appear as undesired components in the digital signal after conversion into a digital value. In an embodiment, each FIR filter has programmable tap weights. The tap weights can be selected to compensate for either alpha band limiting or jammer rejection as described in more detail below. Alpha is the expansion over the Nyquist bandwidth i.e. 0.1 to 0.25 typically; this band limits the signal by introducing controlled inter-symbol interference.

Intermodulation compensator 204 provides compensation for intermodulation products produced by the non-linearities in the system, such as those produced by the nonlinearities reflected in the input intercept points 2 and 3 (IIP2 and IIP3) measurements. The IIP2 and IIP3 are measurements that predict the magnitude of intermodulation products as a function of the input power level and non-linearities of the system.

In one embodiment, intermodulation compensator 204 receives two or more bit streams from Sigma Delta A/D converter 202 (based on the implementation and how many interfering signals are to be compensated), because Sigma Delta A/D converter 202 outputs two or more copies of the digital samples at a sampling rate greater than the sampling rate of the final digital down conversion. One output from Sigma Delta A/C converter 202 is sent to FIR filter 206, while the other copy is sent to FIR filter 208. FIR filter 206 operates as a band pass filter and filters one bit stream from Sigma Delta A/C converter 202 for the signal of interest, (such as the desired digital information signal at the IF), thereby producing the signal-of-interest that includes the in-band interference signal, but not the source signals if the interference signal was a product of intermodulation mixing.

In one embodiment, FIR filter 208 operates as a band reject digital filter at the passband of interest for the signal of interest and produces a copy of the out-of-band signals that are the source of the in-band interference intermodulation products. The out-of-band signals are used to compute estimates of the in-band intermodulation products, which are then used to cancel the interference. A processor 220 computes the expected in-band interfering signals based on the IIP2, IIP3, and other attributes of the system such as phase and amplitude offsets.

FIR filter 222 is a band pass filter that passes the intermodulation products that fall in band of the SOI. The estimate of the interfering signal is inverted to produce a cancellation signal 224. An adder 226 adds the inverted cancellation signal 224 into the original desired signal from FIR filter 206 to cancel interference signals within the original Signal of Interest (SOI).

The output of adder 226 is input to correlator 228. In one embodiment, correlator 228 cross correlates the inverted estimate of the interfering signals with the SOI after the addition of the estimate of the intermodulation interference and uses a zero forcing (or other adaptive algorithm that reduces, and potentially minimizes, the interference such as, for example, a dither algorithm) algorithm 230 to force the cross correlation to approach a minimum (e.g., until the cross correlation is at a minimum). More specifically, correlator 228 adjusts the phase and amplitude of the estimated interference signals with a zero forcing (or other adaptive) algorithm 230 to create control signals that are fed into and control the invert cancellation signal 224. This control loop may run continuously to adaptively cancel the in-band interfering signals.

The output of adder 226 is also fed into low pass filter 232. Low pass filter 232 performs data band pass filtering to remove any remaining harmonics above the baseband signal. The output of low pass filter 232 is filtered by high pass filter 240 to eliminate any DC offset and to create filtered digital baseband signal 250.

FIG. 2B illustrates a block diagram of a more detailed alternate embodiment of an intermodulation compensator.

Referring to FIG. 2B, intermodulation compensator 204 operates similarly to the operation of the receiver in FIG. 2A described above. Intermodulation compensator 204 comprises a FIR filter and down sample cell that generates signals 206, 208A and 208B. In one embodiment, signal 206 is a 20 Mega sample per second, 6 bit signal of interest. Signals 208A and 208B represent the out of band signals are processed by processors 220A and 220B and they are also at 20 mega samples per second and 6 bits. Processor 220A and processor 220B are used to compute the estimate of the in band interference signals which will be used to cancel the interference signal inband of the SOI. Processor 220A and its associated components 224A and 228A phase adjust, amplitude adjust, and perform signal inversion on the computed transmitter feed through intermodulation products. Processor 220B and its associated components 224B and 228B phase adjust, amplitude adjust, and perform signal inversion on the computed intermodulation product from the source signals. The phase and amplitude adjusted inverted signals from processors 220A and 220B are added to signal 206 via adder 226. The resulting signal is output to correlators 228A and 228B as well as I-Q de-interleaver and baseband processor interface cell.

Note that the clocking and sampling rates specified herein are for one embodiment. In alternative embodiments, different clocking and sampling rates, may be for different applications and signals of interest.

Figure 3:
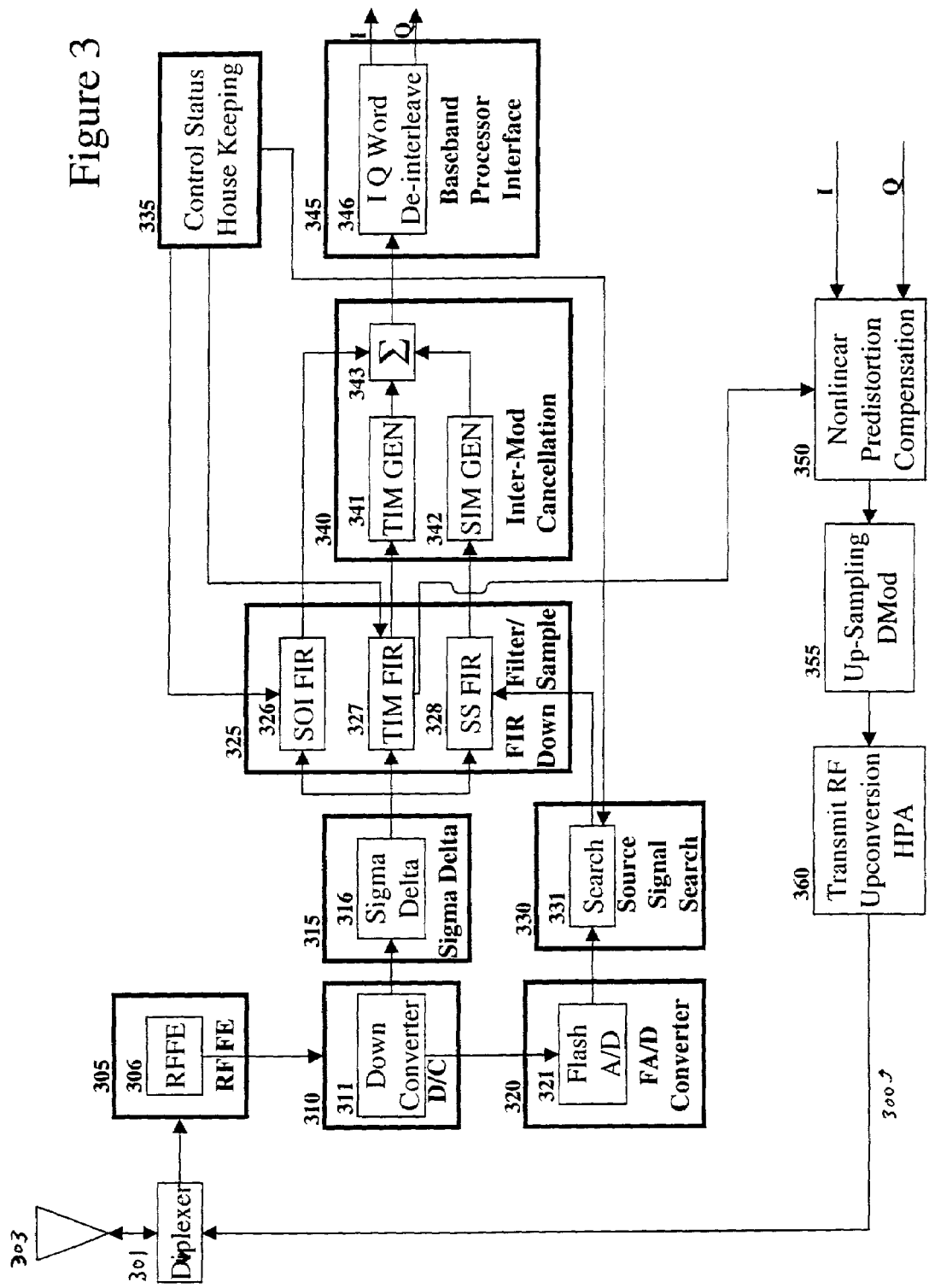
FIG. 3 illustrates a block diagram of an alternate embodiment of the receiver having a sample rate multiplier and an intermodulation compensator.

FIG. 3 illustrates a block diagram of an alternate embodiment of the receiver and a high level embodiment of the companion non-linear transmitter. Different embodiments may have the receiver and/or the transmitter.

Referring to FIG. 3, the receiver 300 includes a duplexer 301, an antenna 303, an RF front end cell 305, a down converter cell 310, a Sigma Delta cell 315, a flash A/D cell 320, a FIR filter and down sample cell 325 (also known a decimating filters), a search cell 330, a control and status/house-keeping cell 335, an intermodulation cancellation cell 340, a baseband processor interface 345. In the receiver, the Sigma Delta cell 315 and flash A/D cell 320 are sampling rate multipliers, but are used to two very different purposes. In the transmitter, there exists a non-linear pre-distortion compensation module 350, an up-sampling and delta modulator module 355, and a high power amplifier 360.

Antenna 303 is connected to duplexer 301. While in receiver mode, duplexer 301 feeds incoming signals into a RF front end (RFFE) cell 305. A RFFE module 306 in the cell receives the signal, amplifies the signal with a LNA, and filters the signal with a SAW filter. The amplified and filtered signal is passed to the IF down converter (D/C) cell 310. D/C cell 310 uses a down converter module 311 to down convert the signal. D/C cell 310 passes copies of the down converted analog signal to Sigma Delta cell 315 and flash A/D cell 320. Sigma Delta cell 325 uses a Sigma Delta A/D converter module 316 to produce multiple copies of samples of the signal to be sent to FIR filter and down sample cell 325 (decimating filters).

In one embodiment, FIR filter and down sample cell 325 contains three modules: a signal-of-interest FIR module (decimating filter) 326 to filter and down sample the signal-of-interest, a transmitter feed thru FIR module (decimating filters) 327 to filter and down sample the transmitter feed thru and the "half way signal", which is a signal half way between the transmit and receive band, and a source signal FIR module (decimating filters) 328 to filter and down sample other source signals. These signals are the signals in the receive band that create the intermodulation products that produce an interfering signal(s) in the SOI pass band.

The transmitter feed thru path 327 can be used to cancel a close in jammer (close to the receive SOI) that can be modulated by the transmit signal feed thru. In one embodiment, the transmitter feed thru appears as a modulation on a high amplitude close-in blocking signal. The techniques described herein are intended to include the mitigation of this interference by the computation of the resultant interference in the band of the signal of interest. The blocking signal is isolated and it is used, along with the transmitter feed thru, to compute the estimate of the interference signal for cancellation of the inband interference.

The flash A/D cell 320 uses a flash A/D module to sample the receive band to a medium resolution (approximately 4 bits) at a high enough rate to avoid aliasing. This digital sample is sent to the source signal search cell 330. Source signal search cell 330 uses a search module 331 to search for intermodulation source signals. This may be done by a multi step process in which the discrete Fourier transform (or a Fast Fourier Transform) is computed for a spectral resolution of 3 MHz to look for significant energy (high energy relative to other components) components in 3 MHz bands. For those bands with significant energy, a second set of discrete Fourier transforms (or a Fast Fourier Transforms) are computed for bands with 300 kHz pass bands. This process is continued until the band pass of the source signals have been isolated. This can be done to any frequency resolution desired. In one embodiment, the search is only carried to the second level. The source signal search function does not isolate and band pass the source signals, but simply identifies the bands where they are located. The decimating filters isolate the source signals.

In one embodiment, the low resolution 4 bit samples from the Flash A/D converter are narrow band filtered, around the source signals, to yield a 6 to 8 bit sample and these samples are used to generate the estimate of the intermodulation products for the cancellation process.

The identified frequencies of the intermodulation source signals are sent to source signal module 328. In one embodiment, a control and status/house-keeping cell 335 controls search module 331, the signal-of-interest FIR module 326, and the transmitter feed FIR module 327. In one embodiment, the control and status function provides information to the others cells as to the location of known signals such as the transmitter, so the search algorithm does not confuse it for another signal.

All three of the filtered signals sets are passed from FIR filter and down sample cell (decimating filters associated with the sigma delta A/D) 325 to intermodulation cancellation cell 340. In intermodulation cancellation cell 340, a transmitter feed thru intermodulation products generation module 341 uses the filtered transmitter feed thru and associated interference source signal half way between the transmitter and the receiver signal to compute the intermodulation interference produced by the transmitter feed thru and other mixing signal(s). A Source Signal Intermod (SIM) generation (SIM GEN) module 342 uses the filtered source signals from decimating filters 328 to compute the estimate of the intermodulation interfering signals. A cancellation summing cell 343 inverts and combines both of these signals with the filtered signal-of-interest to produce a signal-of-interest with the intermodulation interference canceled. The resulting signal-of-interest is sent to a baseband processor interface 345. In one embodiment, cancellation summing cell 340 includes a control loop that adjusts the phase and amplitude of the canceling signals to reduce, and potentially minimize, interference, as described in more detail below.

In one embodiment, transmitter feed thru module 327 receives a signal from search cell 330 that identifies the location of a close-in blocking signal and then transmitter feed thru module 327 isolates the blocking signal and uses it along with the transmitter feed thru to generate an estimate of the interference generated by the transmitter feed thru amplitude modulating the blocking signal.

Baseband processor interface 345 uses a digital word de-interleaving module 346 to separate the signal into in-phase and quadrature signals to be sent by baseband processor. In on embodiment, the baseband processor may perform a final digital down conversion. This may be done by taking four time samples and using the first two as I and Q and dropping the next two. In one embodiment, the first and the third samples are averaged to get the I value and the second and the fourth are averaged to get the Q sample. In some cases, this improves the SNR by 3 dB. If the sample rate is not high enough after this is performed, then the intermediate values are achieved by interpolation. This process guarantees the I and Q signals are in perfect quadrature. If the I and Q signals are required to be coherent, a phase lock loop can be used to determine the time offset and the samples can be shifted achieve coherence.

In one embodiment, the receiver may digitally down-convert the signal of interest independent of the type of modulation associated with the signal because the interference is being removed from the signal without foreknowledge of the type of modulation associated with the signal of interest. The type of modulation could be, for example, amplitude modulation, frequency modulation, or pulse modulation, amplitude phase modulation, phase keyed modulation, TDMA, FDMA, CDMA or any other type of modulation. The present invention does not require a unique modulation for either the signal of interest (SOI) or the interfering and cancellation signals.

In one embodiment, the non-linear transmitter processor chain uses a similar architecture to transmit signals, a sigma delta D/A converter. In another embodiment, a conventional D/A converter with a conventional up conversion scheme may be used in conjunction with the non-linear pre-distortion. The I and Q digitally sampled signals are sent to a non-linear pre-distortion compensation module 350, which provides pre-distortion and combines the I and Q signals. In one embodiment, samples from the transmitter feed thru from the receiver are used to update the pre-distortion compensation. The update to the non-linear pre-distortion may be performed by comparing a copy of the transmitter feed thru signal (which is a copy of the transmitter signal after the high power amplifier (HPA) non-linearity) to a non-pre-distorted copy, or the original signal. If the non-linear pre-distortion in the transmitter has been done perfectly, the difference in these two signals is zero. Any variation indicates a need to update the non-linear pre-distortion corrections for the AM/AM and the AM/PM. In one embodiment, the copy of the transmitted signal is received from the receiver, and in another embodiment, the transmitter has a signal path used to down convert and demodulate a copy of the signal after it has gone thru the HPA. In either way, the non-distorted transmit signal is compared to the transmitted signal to update the pre-distortion function. This provides a continual update to the pre-distortion function over time and temperature which can be critical in devices without temperature compensation such as, for example, mobile devices. The combined signal is sent to up-sampling and delta modulator module 355 for up-sampling and delta modulation. Thereafter, the signal is up converted and amplified by transmit RF conversion and high power amplifier (HPA) 360. The amplified signal from HPA 360 is sent to duplexer 301 to be transmitted from antenna 303.

The baseband processor may be implemented as one or more integrated circuit (IC) chips. The receiver supports a very large number of different vendors' baseband chips. The only changes that might be useful would be minor changes for each unique control and status interface for different vendors. In alternative embodiments some or all portions of the transmitter and receiver may be incorporated on the same integrated circuit as the baseband processor.

Figure 4:
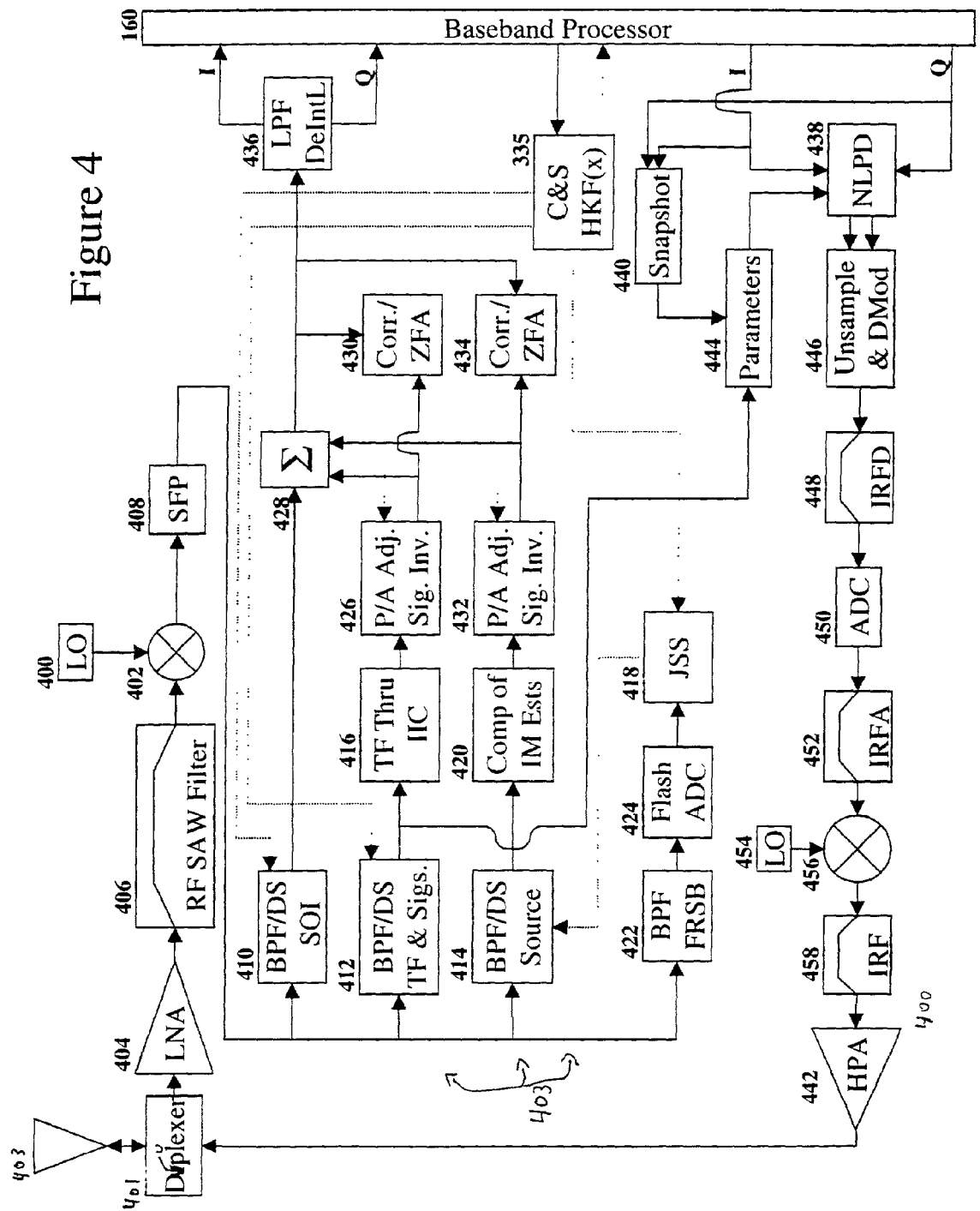
FIG. 4 illustrates a block diagram of an alternate embodiment of the receiver having a sample rate multiplier and an intermodulation compensator.

FIG. 4 illustrates a block diagram of another alternate embodiment of a wireless communication receiver and transmitter. As above, the transmitter and receiver may be implemented as multiple ICs or as a single IC. Referring to FIG. 4, receiver 400 comprises an RF front end includes similar components as above including LNA 404, a RF SAW filter 406, local oscillator 400 and down-conversion mixer 402. In one embodiment, the receiver chip may or may not include the down conversion local oscillator 400 and mixer 402. In another embodiment, the LNA may be on or off chip.

Antenna 403 is coupled to a duplexer 401. Receiver 400 receives its input from an output of duplexer 401 and outputs 6 bit in-phase (I) and quadrature (Q) data streams to baseband processor 160. In other embodiments, the number of bits output to the baseband processor may be increased or decreased as required. In one embodiment, SAW filter 406 has a bandwidth of 140 MHz connected to LNA 404. In alternative embodiments, the function performed by the SAW filter may be more narrow or wider depending on the signal space of interest and the sources of interfering signals. The 140 MHz SAW filter 406 passes the signal of interest, i.e. the desired signal, as well as all of the signals that produce intermodulation products. In one embodiment, duplexer 401 provides reasonable attenuation beyond the receive band of 1930 to 1990 MHz. The RF front end accommodates the entire bandwidth of the receive band because any designated frequency between 1930 and 1990 MHz may be assigned on a quasi-random basis. The out-of-band signals such as the transmit bands from 1850 to 1910 MHz are attenuated by approximately 50 dB. In alternative embodiments, the RF frequency band may be different, such as for telephony bands in other parts of the world, Cellular bands in the U.S. (800 MHz), wireless LAN in the ISM band and 5 GHz band. Satellite applications will have other RF bands for which this invention will be applicable. Fixed wireless could be any frequency from 1 to 60 GHz and wired applications, such as, for example, cable modems, DSL and others, can have a wide range of frequencies. The present is applicable to wired as well as wireless applications.

In one embodiment, the transmitter signal can be as high as +30 dBm with the receiver as low as −119 dBm. Duplexer 401 attenuates the transmit signal by approximately 50 dB, leaving the transmitter feed through at −20 dBm. Duplexer 401 feed thru of the transmitter signal could be one of the largest jammer source signals in the receive path and result in intermodulation products by mixing with other extraneous signals and generating intermodulation products in LNA 404, down converting mixer 402 and associated amplifiers in the receive chain. A jammer source signal is a signal present in receiver 400 that has the potential to produce mixing intermodulation products, which can interfere with the signal-of-interest.

After the down conversion to IF, receiver 400 passes the 140 MHz (which may be a different bandwidth in other embodiments) to capture the signal-of-interest and the potential source signals for intermodulation generation.

Figure 5:
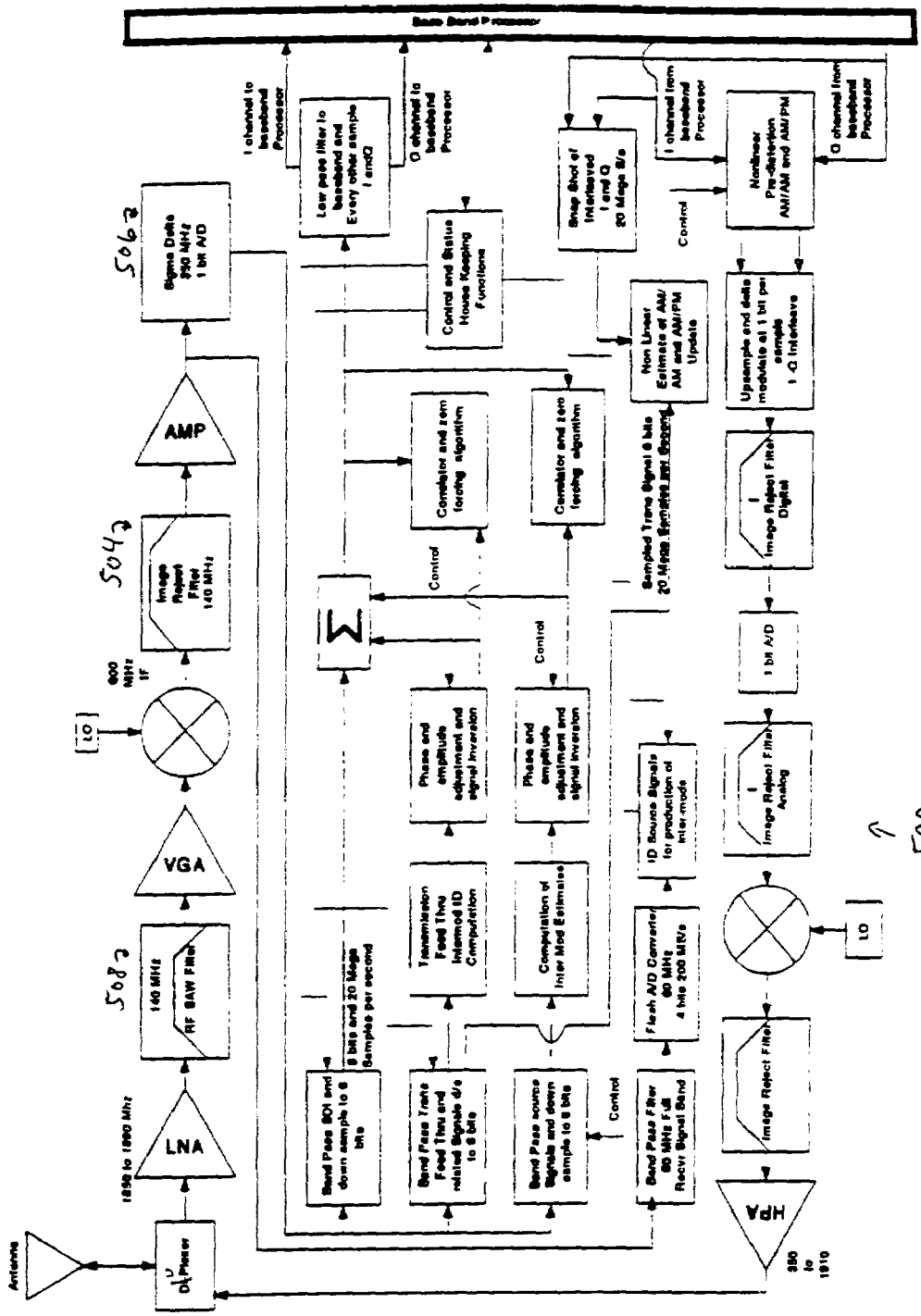
FIG. 5 illustrates a block diagram of an alternate embodiment of the receiver having an image reject filter to limit the sources of interference affecting the signal of interest.

FIG. 5 illustrates a block diagram of an alternate embodiment of the receiver having an image reject filter to limit the sources of interference affecting the signal of interest. Receiver 500 contains an image reject filter 504 to perform image rejection on the signal of interest before applying Sigma Delta A/D converter 506. Image reject filter 504 will filter out all undesirable mixing products from the down conversion mixing process. The passband of the front of the system including SAW filter 508 and the band pass of image reject filter 504 is matched to the range of bandwidths that may contain the signal of interest and interference source signals. In one embodiment, image reject filter 504 is an off-chip filter. In another embodiment, image reject filter 504 is an on-chip filter. Image reject filter 504 may be either part of the sampling, filtering and processing (SFP) unit 408 or a down conversion unit. In an embodiment, due to the fast sampling rate of the sampling process, image reject filter 504 has only a few poles with a pass band of 140 MHz to avoid aliasing with a nominal 350 mega sample per second sampler. In one embodiment, image reject filter 504 is a reasonably benign filter and, in combination with the out of band rejection features of the subsequent decimating filter, provides adequate filtering, thus eliminating the need for an intermediate frequency SAW filter (which is not shown in this figure).

Referring back to FIG. 4, after the sampling has been accomplished, the sampled 140 MHz wide signal is sent to the bank of digital band pass filters, namely BPFs 410, 412, 414, which are decimating filters. The analog signal is tapped off prior to the sampling function and sent to an analog filter 422 which supports the flash A/D and the search function discussed herein. This bank of band pass filters includes a BPF for the signal-of-interest (BPF 410), a BPF for the transmitter feed through and associated signals (BPF 412), and a BPF for source jammer signals (BPF 414). These are the sigma delta related decimating filters. Source jammer signals produce in band inter-modulation products. In one embodiment, all of these signals are down sampled and processed at 6 bits and 20 mega samples per second. The exact sampling rate may vary in different embodiments of the invention depending on the requirements of resolution and bandwidth.

In one embodiment, BPF 410 is a programmable digital filter used to band pass the signal-of-interest and subsequently down sample to yield a high signal noise, narrow band, high bit resolution digital signal. In alternative embodiments, BPF filter 410 for the SOI is fixed and the LO is adjustable to place the signal of interest in the same place when the down conversion is performed. In one embodiment, this filter is a FIR filter with 90 to 128 taps. In another embodiment, the filter is a complex set of filters with intermediate down-sampling. In one embodiment, the FIR filter has programmable tap weights and the tap weights are selected for jammer rejection to reject jammer signals close to the signal-of-interest. In one embodiment, the jammer signals are as close as 900 kHz and 1700 kHz off center band of a 1.23 MHz wide signal. In alternative embodiments, the jammer source signals can be any where in the receive band. In one embodiment, the jammer signals are as high as −30 dBm with the signal-of-interest at −116 dBm. The output of BPF 410 is sent to cancellation unit 428 (e.g., signal adder, summation unit, etc.) where the interference intermodulation product signals are cancelled.

In one embodiment, the intermodulation compensator 403 may operate as follows. BPF 412 band pass filters the transmit signal and any signal that falls "half way" between the transmitter and the receive signal. These half way signals, when mixed with the transmit feed through signal, can drop an intermodulation product in band of the signal-of-interest. Since the location of these signals is known, no search algorithm is required. In one embodiment, BPF 412 is a programmable FIR filters programmed to filter the transmitter signal and the other mixing signals. In alternative embodiments, BPF 412 may be a fixed set of filters. The output signals from BPF 412 are sent to a processing block 416 that generates an estimate of the intermodulation product(s). In one embodiment, these signals are 6 bits and 20 mega samples per second. The output of BPF 412 and the output of 410 are at the same quantization (number of bits) and clock rate. The source signals, and thus the estimate of the intermodulation products, are generated from the same bit stream as the SOI and this makes keeping the signals coherent much easier, which, in turn, makes generating accurate and timely interference cancellation signals possible. It is also easier to cancel the interference signals if all the signals have seen similar transfer functions.

Analog bandpass filter 422 is an anti-aliasing filter prior to the flash A/D converter 424. In one embodiment, flash A/D converter 424 is a low to medium resolution A/D converter (around 4 bits) that samples the entire band in which source signals can exist and which have the potential to produce intermodulation products inband of the SOL A search unit 418 detects the presence of the energy of source jamming signals that have the potential to generate in-band intermodulation products. When signals of sufficient energy are detected with the correct relationship to generate in band intermodulation products, the frequencies are passed to BPF 414, which filters the signals of interest and passes them to processing unit 420 where an estimate of the intermodulation product(s) is generated. These signals are 6 bits and 20 mega samples per second.

In one embodiment, filters 412 and 414 are only a few poles and fairly benign in that the out of band roll off characteristics can provide shallow shirts. Steep filters are not desired here, as the source signals passed are used to generate the estimate of the intermodulation products in the time domain. Further, the actual signal should be filtered as little as possible, such that the time domain representation of the signal is as accurate as possible without passing unwanted signals and noise. The side lobes are desired for signal accuracy in the time domain. A copy of the transmitter feed thru signal is also sent to parameters 444 on the transmitter portion to update a non-linear pre-distortion algorithm.

The interference compensation functions associated with filter 414, filter 420, intermodulation product signal generator (phase and amplitude adjuster) 432, cancellation unit 428, 434, filter 422, flash A/D converter 424 and jamming signal search unit 418 can be readily expanded to filter and process, for cancellation of intermodulation products, as many signals as desired. In one embodiment, this application is restricted to the IS-95 number of jammers to save power.

Bandpass filter 422 and flash A/D converter 424 provide the digital samples required by the jamming signal search unit 418. At the output of the IF amplifier, the analog signal is sent to the anti-aliasing band pass filter 422 and flash A/D converter 424. In one embodiment, the analog signal is a 140 MHz signal that is filtered with a bandpass filter 422 with a band pass of 60 or 120 MHz corresponding to the receive band of the Code Division Multiple Access (CDMA) signals. In alternative embodiments, the band pass of anti-aliasing band pass filter 422 is determined by the requirements of the specific application, wired or wireless. After the filtering, the signal is sampled with flash A/D converter 424 at 200 to 350 MS/s at 4 bit resolution. The sample rate is determined by the bandwidth of the anti-aliasing filter and the number of bits may vary in various embodiments. Search unit 418 uses the digital samples to find the location of signals with energy beyond a selected threshold which could generate SOI inband intermodulation products. The threshold may be determined by the particular application. For each application, there are levels below which the source signals do not generate intermodulation products large enough to be of a concern. When source signals are present, which can produce intermodulation products, inband of the SOI, the strongest interferers are processed. Search unit 418 passes the frequencies to BPF 414 for filtering the high fidelity 6 bit copies of the source signals at 20 MS/s. Actual rates and quantization levels are dependent on the particular application and embodiment.

In one embodiment, if there is the potential for more than one intermodulation product to fall inband of the SOI and in this case, the processes may select the largest. Search unit 418 is designed to find the signal energies and pass the frequencies to BPF 414 within 10 msec or less. In some embodiments, the timing requirements may be different and is an implementation issue that may be resolved by parallel processing if required. CDMA specification allows for a frame error rate of 0.01 frames when the jammer signals are present. Each frame is 20 msec. This frame hit is only taken once. In one embodiment, search unit 418 searches for as many jammer signals as desired. In theory, any number of jammers can be managed depending on the complexity of the implementation.

In one embodiment, when the transmitter and the "half way" signal are received by the transmitter feed-through intermodulation products generator 416, the samples are multiplied in the time domain to generate the estimate of the intermodulation product. When a source signal is no longer present, the estimate of the intermodulation goes to zero because one of the signals is either multiplied by zero or a very small signal. The estimate of the intermodulation product is sent to the intermodulation cancellation signal generator 426 where the signal is adjusted for phase and amplitude by phase/amplitude adjuster functionality therein and inverted by inverter functionality to cancel the intermod in the band of the SOI.

The amplitude of the intermodulation product is estimated by the knowledge of the estimated IIP3 and sometimes the IIP2. The estimates of the IIP2 and IIP3 are updated as the corrections are made to the phase and amplitude of the estimated intermodulation product to reduce, and potentially minimize, the interference. The estimate of the intermodulation product is sent to cancellation unit 428 for cancellation of the intermodulation product(s) as well as to the correlation and correction unit 430 where the corrections to the phase and amplitude of the estimate are computed via an adaptive algorithm, such as a zero forcing algorithm. In one embodiment, the algorithm is a dither algorithm which uses two correlators, one is used to correct the phase and one is used to correct the amplitude. Other algorithms can be used and may be based on least squares of estimates and errors and like algorithms.

The transmitter feed thru can appear as an amplitude modulation on a high power close in jammer as is possible in an embodiment of the invention for CDMA IS-95/98 and CDMA 2000. In this case, the transmitter feed thru filtered in filter 412 and a second signal from the close in jammer may be used to generate a canceling signal for this interference.

In one embodiment, with respect to the correlation and correction function 430 and 434, a copy of the estimate of the intermodulation product is received from intermodulation cancellation signal generator 426 or from intermodulation cancellation signal generator 432. This function also receives a copy of the SOI after cancellation of the intermodulation products in cancellation unit 428. The signal received from intermodulation cancellation signal generator 426 or intermodulation cancellation signal generator 432 (depending on which intermodulation product is being talking about), is fed to two internal correlators. In the first correlator, the signal from intermodulation cancellation unit 426 for intermodulation cancellation signal generator 432 is phase shifted by 90 degrees and the cross correlation between this signal and the output of cancellation unit 428 is computed. The second correlator correlates the signal from intermodulation cancellation signal generator 426 or intermodulation cancellation signal generator 432 with the output of cancellation unit 428. By using a dither algorithm to reduce, and potentially minimize these correlations and alternately adjusting the phase and amplitude of the estimate of the intermodulation product, the interference is reduced (and potentially minimized). This technique provides for control on the adjustment of the phase and amplitude of the intermodulation product estimate to reduce (and potentially minimize) the interference.

Figure 11:
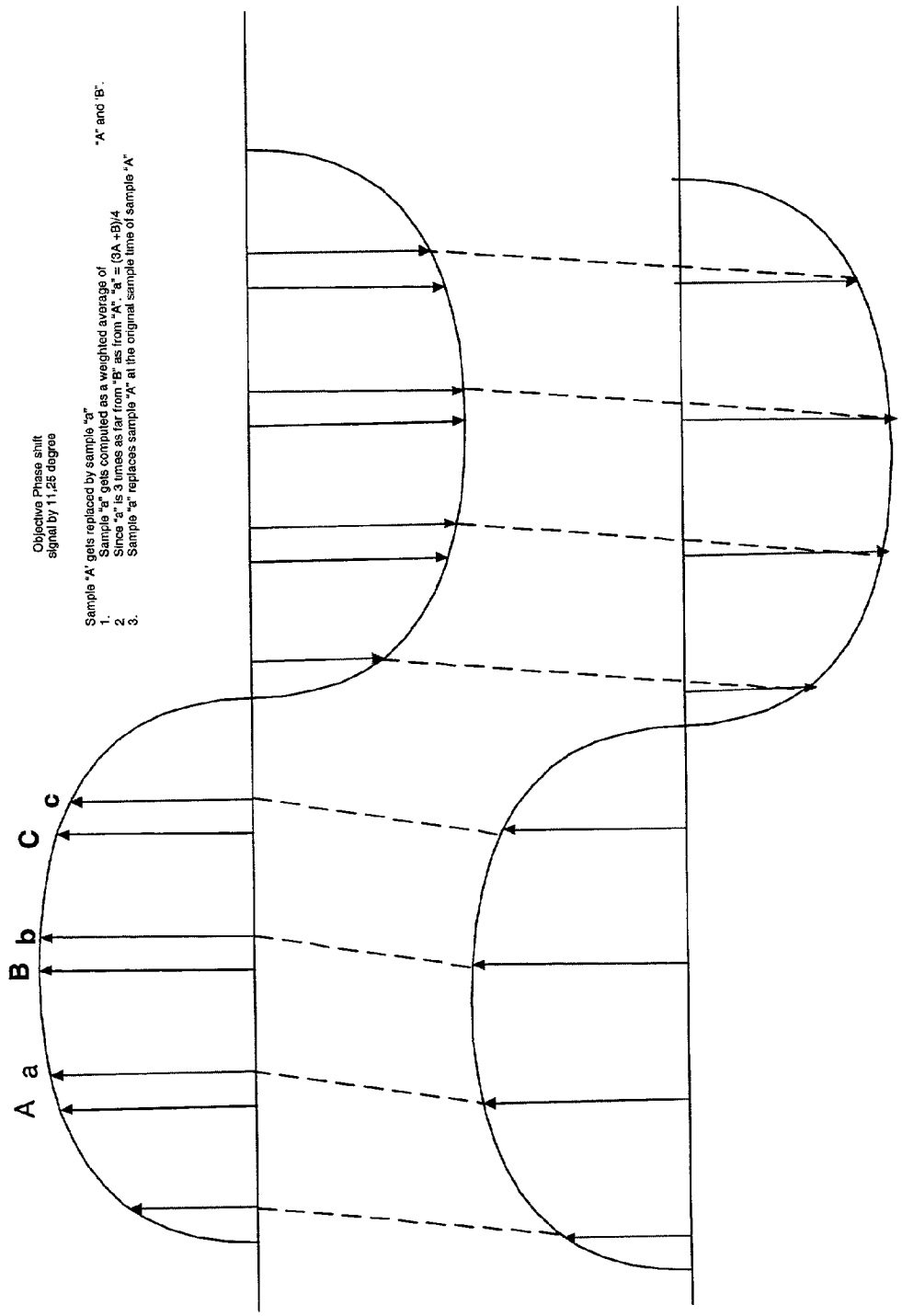
FIG. 11 illustrates the phase as adjusted by a desired increment.

In intermodulation cancellation signal generator 426 and intermodulation cancellation signal generator 432, the phase and amplitude of the estimate of the intermodulation product is adjusted with sufficient granularity so as to closely match the phase and amplitude of the intermodulation product generated in the non-linearities. When the number of samples is low relative to the carrier frequency, a simple delay of digital samples does not provide sufficient resolution of the phase adjustment. As an example, when the sample rate is 20 mega samples per second, and the IF is around 5 MHz (as can happen with the down sampling), each sample is only about 90 degrees. FIG. 11 shows how, in one embodiment, the phase is adjusted by any desired increment, even when the sample rate is low. In this embodiment, the original samples A, B, and C, are converted to samples a, b, c by weighted interpolation. The new samples a, b, and c are mapped into the time slots of A, B, C. In one embodiment, the phase shifting function is performed using a FIR filter with only a few taps. By properly selecting the weighting of values A, B, and C in the interpolation process, any arbitrary phase shift can be achieved. The amplitude may be adjusting by simple scaling.

When the intermodulation products generator 420 receives the jammer (source) signals, the samples are multiplied in the time domain to generate an estimate of the intermodulation product. When a source signal is no longer present, the estimate of the intermodulation goes to zero because either one of the signals is multiplied by zero or a very small signal. The intermodulation estimate is sent to the intermodulation cancellation unit 432.

The amplitude of the intermodulation product is estimated by the knowledge of the estimated IIP3 and sometimes the IIP2. These estimate IIP2 and IIP3 are updated as the corrections are made to the phase and amplitude of the estimated intermodulation to reduce, and potentially minimize, the interference. The estimate of the intermodulation is sent to the canceling unit 428 for cancellation of the intermodulation product(s) as well as to the correlation and correction unit 434 where the corrections to the phase and amplitude of the estimate are computed via an algorithm, such as a zero forcing algorithm or dither algorithm or other as described above. The generation of jammer signal intermodulation products and cancellation signals is expanded to compute as many signals as desired. In an embodiment, restricting this application to the IS-95 number of jammer signals saves power. Prior to the cancellation process, the estimates of the intermodulation products are filtered to only pass those which fall inband of the signal of interest.

In one embodiment, the estimates of the intermodulation products from the jammer signals and the transmitter feed through related intermodulation products are inverted and added at 6 bits and 20 mega samples per second to the signal-of-interest. The output of cancellation unit 428 is sent to the de-interleaver 436 and the correlation units 430 and 434. With the output of the cancellation unit and the copy of the estimate of the intermodulation products, correlation units compute the cross correlation between the estimate of the intermodulation products and the signal-of-interest after the cancellation process. In one embodiment, the correlation unit sends control signals, such as phase and amplitude corrections based on a zero forcing algorithm (or some similar function to reduce or minimize the interference) to the phase and amplitude adjustment and signal inversion units 426 and 432. In one embodiment, this is done for the minimal set of signals (2 signals) as specified by IS95 but can be expanded to any number of signals based on the application.

The estimate of the intermodulation products is inverted and added using adder 428 to the signal-of-interest to cancel the intermodulation products. The parameters of the intermodulation generation process change as a function of time and temperature. This architecture maintains continuous estimates of the IIP3 and the IIP2 and continuously updates the estimates by the phase and amplitude corrections sent from the correlation process. The corrections are determined by the zero forcing (or functionally equivalent such as, for example, a dither) units 430 and 434, which forces the cross correlation between the signal-of-interest and the estimate of the intermodulation products to be substantially kept at a minimum.

In one embodiment, the 20 Mega samples per second at 6 bits per sample output of the cancellation units are input to the de-interleaver 436 where the samples are low pass filtered to baseband signals and the bit stream is word de-interleaved to produce the in-phase and quadrature words at 6 bits and 10 Mega samples per second. (Note that the clock frequencies may vary in different embodiments for different target signals.) The word de-interleaving process produces a complex baseband signal with perfect quadrature. In one embodiment of this invention, the 20 mega samples per second are taken after the interference cancellation unit 428 and consecutive sets of four samples are taken. The first and second are the I and Q samples and the $3^{rd}$ and $4^{th}$ are dropped in that they are just copies of the $1^{st}$ and $2^{nd}$ only 180 degrees shif in time. The samples $1^{st}$ and $3^{rd}$ can be averaged to improve SNR by 3 db. The same is true for the $2^{nd}$ and $4^{th}$ samples. The samples are now at approximately 5 mega samples per second and it is desired to have them at 10 mega samples per second. The samples are interpolated and up sampled at Ms/s the desired sample rate. In another embodiment of the invention, the sample rate out of the decimating filter is 40 mega samples per second and the rate of 10 mega samples per second is achieved with the 4 sample de-interleaving described above.

These clock rates may vary in different embodiments as function of the signals being processed.

The phase de-rotation is performed in baseband processor 160. Since the phase de-rotation is done in baseband processor 160, phasing of the word de-interleaver 436 is not critical because the information is fully contained in the baseband complex signal. That is, what is not in the in-phase signal is in the quadrature signal, and what is not in the quadrature is in the in-phase signal. If a coherent de-rotated signal is required, the coherent detection may be performed using standard phase lock techniques.

The architecture also includes a transmit path that provides for a non-linear processing of the transmitter signals. In one embodiment, the transmit path receives the 10 bit in-phase signal and quadrature samples at 10 Mega Samples per second. The signals are sent to non-linear pre-distortion (NLPD) unit 438 and snap shot sampler 440. The I and Q samples are input to pre-distortion unit 438, which performs pre-distortion with the opposite amplitude modulation/amplitude modulation (AM/AM) and amplitude modulation/pulse modulation (AM/PM) distortions induced by the non-linear elements in the transmit chain. Snap shot sampler 440 captures samples of the I and Q signals prior to pre-distortion. These represent an ideal signal at the output of the high power amplifier (HPA) 442. These signals are compared to the transmitted signal and the result is used to update parameters 444 which stores the amplitude modulation/amplitude modulation and amplitude modulation/pulse modulation pre-distortion parameters. In one embodiment, the transmitter feed thru signal from the function 412 is used as the post non-linearity sample which is compared to the non-pre-distorted sample of the transmit signal. In another embodiment, the transmitter has its own down conversion and sampling function to get the post non-linearity signal sample for comparison.

The I and Q signals are orthogonal and the vector sum of the two represents the power of the composite signal. The amplitude modulation/amplitude modulation and amplitude modulation/pulse modulation distortions can be inverted and the pre-distorted I and Q signals are corrected by non-linear pre-distortion unit 438 by non-linear distortions of the transmit chain to produce a pristine non-distorted signal at the output of the HPA 442. The initial values of the amplitude modulation/amplitude modulation and amplitude modulation/pulse modulation distortions can be pre-determined at manufacture or can be determined by the built in process described herein. Receiver 400 processes a copy of the transmit signal as part of the intermodulation compensation scheme 416 and this signal is available for calibration of the amplitude modulation/amplitude modulation and amplitude modulation/pulse modulation parameters. All values of the amplitude modulation/amplitude modulation and amplitude modulation/pulse modulation parameters for all transmit power levels do not need to be stored. A simple 3 or $5^{th}$ order fit to the amplitude modulation/amplitude modulation and amplitude modulation/pulse modulation curves will provide the required fidelity. The amplitude modulation/amplitude modulation and amplitude modulation/pulse modulation corrections can be made via a look up table implementation or some other mechanism.

In one embodiment, after the I and Q samples have been pre-distorted to compensate for the non-linearities in the transmit chain, the I and Q samples are processed and interleaved by unit 438 to produce the composite digital transmit signal at 10 bits per sample at 20 Mega samples per second.

As part of the receiver intermodulation cancellation unit 412, a copy of the transmit signal is demodulated. A 6 bit 20 Mega sample per second copy of the transmit signal is available from receiver 400. A snap shot sample of the non-pre-distorted I and Q samples are available from snap shot sampler 440. The snap shot I and Q samples are word interleaved to produce a composite signal. In the amplitude modulation/amplitude modulation and amplitude modulation/pulse modulation correction calibration process 444, the interleaved snap shot samples are correlated with the receiver 400 provided copy of the transmit signal and these two signals are word (bit wise) shifted to achieve an optimum correlation. Any difference in the amplitude of the time-aligned samples indicates the need to update the pre-distortion parameters. The amplitude modulation/amplitude modulation and amplitude modulation/pulse modulation correction parameters may be continuously updated. This update process 444 need not be a real time process, but faster than the anticipated changes in the non-linear components, which are a function of time and temperature.

After the digital baseband signals have been pre-distorted 438 to compensate for the transmitter non-linearities an up-sampling and delta modulation process is performed by unit 446 where up sampling values are determined by linear interpolation between the 20 mega sample per second samples. This process produces a 1 bit per sample bit stream at a sample rate of approximately 100 to 200 MHz.

Thereafter, this bit stream is filtered by an image reject digital filter 448 then put through a one bit A/D converter (ADC) 450. In one embodiment, when the 1 bit A/D converter 450 processes the 100 to 200 MHz bit stream, images of the analog signal will be produced at every harmonic of the sampling rate. An image rejected analog filter 452 is place at the desired IF and the image reject filter 452 rejects these images. Since the sampling rate is rather high, the images will be spaced by multiples of the sampling rate. This should allow for an on chip image reject filter of only a few poles.

The signals are then up converted to RF using a local oscillator 454, mixer 456 and an image reject filter 458. Assuming an IF on the order of 200 to 600 MHz (TBR), mixer 456 and potentially the local oscillator 454 and image reject filter 458 can be on chip components.

HPA 442 is a large source of non-linear distortion in the transmit chain. Since this is not a classical direct conversion architecture, the residual carrier problem is not a critical concern since there is no carrier signal at the radio-frequency transmit frequency or any harmonic of it.

With the non-linear pre-distortion, HPA 442 can be operated much closer to saturation without clipping the signal and causing the re-growth of side lobes. In one embodiment, a root raised cosine (RRC) type filter in the baseband processor controls the transmit spectrum, allowing the overshoot between symbols can be on the order of 3 to 4 dB depending on the alpha selected. Alpha determines the excess bandwidth over that of a perfect Nyquist brick wall filter. In an embodiment, the raised cosine filters introduce controlled Intersymbol Interference (ISI) which controls the spectrum, but also makes the signal non-constant envelop even if it stared out as a constant envelop signal such as QPSK or 8PSK. The intersymbol interference of a raised cosine filter is zero at the center of each adjacent symbol period, but can cause signal over shoots of 3 to 4 dB depending on the alpha selected. The smaller the alpha, the more narrow the bandwidth and the greater the over shoot. This over shoot determines how close to saturation the amplifier may be operated without causing clipping of the signal and re-growth of side lobes in the transmit spectrum.

In an alternate embodiment of the receiver, the passband of the front of the system is much wider than the desired signal and the potential source signals come from a much wider passband. The second digital filter, which rejects the desired signal and passes the source signal, must cover up to 60 to 120 or more MHz. To avoid aliasing images in band, the sampling rate of the A/D converter should be at least 2.5 times the Nyquist rate. In one embodiment, the Sigma Delta 1 bit sampling rate is 300 to 350 MHz, with the same sampling rate being used for the desired signal bandwidth. The front end SAW filter as radio-frequency is 140 MHz wide to allow passage of all of the potential intermodulation source signals to include feed of the transmitter through the diplexer. The LNA receives this feed through. While the transmitter feed thru is not within the receiver passband, it can mix with other signals half way between the receiver and transmit bands and produce intermodulation products in the receive passband. For this reason, this signal is passed into the sampler to be included in the interference set of source signals.

In one embodiment, at the intermediate frequency, the passband only needs to be 80 MHz since the transmit and receive bands are paired and are 80 MHz apart. The intermediate frequency conversion local oscillator (local oscillator) is adjusted to center the down-converted signal on the selected intermediate frequency. The passband filter can be 80 MHz. The selected Sigma Delta 1 bit A/D sampling rate has been selected to capture the entire 80 MHz without producing aliasing of images. The image reject filter may be able to be an on chip filter with only a few poles due to the wideband of the sampling.

Two copies of the 1 bit A/D Sigma Delta bit steam are created and one is filtered with a passband for the signal of interest. In one embodiment, the filter skirts are made very steep and the close-in interfering signals are filtered out at this point, reducing the dynamic range that must be carried through the system and reduces the required resolution in the desired pass band from 14 bits to approximately 6 or 7. With this embodiment, the in-phase & quadrature channel orthogonality is guaranteed because the 20 mega samples are 6 or 7-bit word deinterleaved to get the in-phase and quadrature samples. This is done after the intermodulation products cancellation, which is done on the in-phase-quadrature composite signal instead of being done on in-phase and quadrature separately.

In one embodiment, the second copy of the Sigma Delta 1 bit A/D bit steam is input to a band reject digital filter at the passband of interest. The down-sampling is done such that the retained passband is 80 to 90 MHz with 3 to 6 bits of resolution per sample. This is adequate because only the very large signals are of interest and cancellation with a resolution of 3 to 6 bits is an enormous benefit.

As in the general case, the high level out-of-band signals are used to compute estimates of the in-band intermodulation products and are then used to cancel the interference.

This compensation architecture is applicable to many other communications systems and this example is not intended to preclude other applications such as Edge, 802.11, Bluetooth, satellite systems and others in this patent. In the CDMA telephony applications, the baseband processor sends 8 or 10 bit words at approximately 10 mega samples per second to the transmitter module. In this architecture, the transmitter has determined the amplitude modulation/amplitude modulation and amplitude modulation/pulse modulation distortion characteristics of the High Power Amplifier (HPA). The nonlinear pre-distortion pre-distorts the in-phase and quadrature vectors such that when the amplifier induces amplitude modulation/amplitude modulation and amplitude modulation/pulse modulation distortions, the result is a corrected signal at the output of the amplifiers. The pre-distortion module adjusts the amount of amplitude modulation/amplitude modulation and amplitude modulation/pulse modulation pre-distortion based on the drive level of the amplifier.

After the pre-distortion is completed, the words are up-sampled by a factor of 10 to a 100:1 by interpolation between the original values. The samples are delta modulated and band passed and then input to a 1 bit D/A converter. The analog signal is now up converted to the transmit frequency. This provides a system with little or no residual carrier at radio-frequency.

Figure 6:
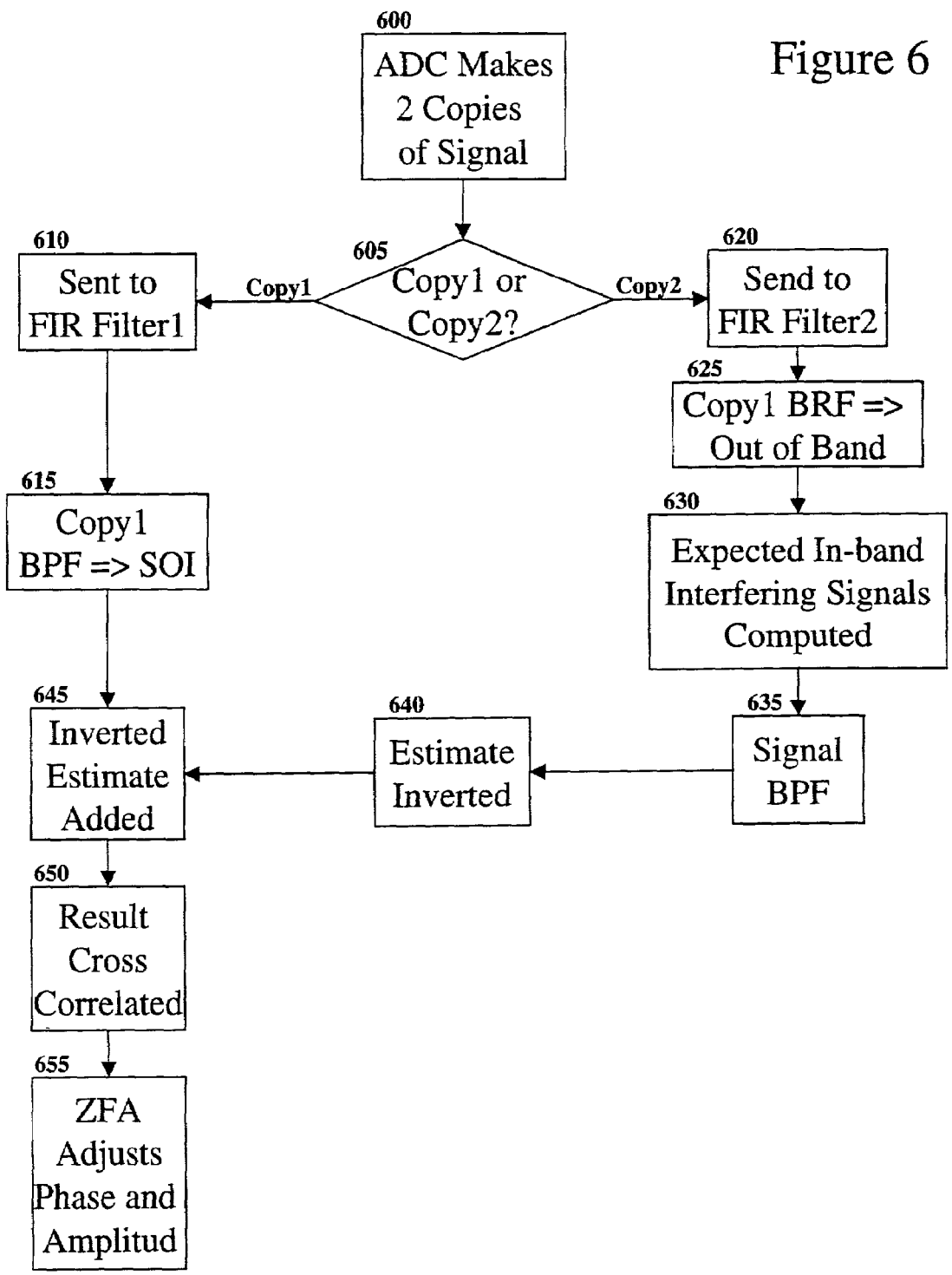
FIG. 6 illustrates a flow chart of a process for compensating for intermodulation.

FIG. 6 illustrates a flow diagram of one an embodiment of processing performed by a receiver to reduce harmonic interference and intermodulation interference from a signal of interest prior to the final digital down conversion of that signal. This flow diagram is applicable to the source signal intermodulation products as well as the transmitter feed thru related intermodulation products.

Referring to FIG. 6, in processing block 600, a Sigma Delta A/D converter 602 outputs two copies of a source signal as digital samples at a sampling rate greater than the sampling rate of the final digital down conversion.

In processing block 605, each copy of the signal is sent to a separate FIR filter in an intermodulation compensator. Note in alternative embodiments, there may be any number of copies of the signal processed to manage multiple intermodulation products. Each FIR filter filters its output signal at the Sigma Delta A/D converter sampling rate to reduce the interference from aliasing tails.

In processing block 610, one FIR filter operates as a band pass filter to pass the signal of interest at an intermediate frequency and produces the signal-of-interest with in-band interference (processing block 615).

In processing block 620, another FIR filter operates as a band reject filter for the signal of interest and produces out of band signals that are the source of the in-band interference intermodulation products.

In processing block 630, an intermodulation compensator computes the expected in-band interference signals based on the IIP2, IIP3 and other non-linear attributes of the system.

In another embodiment, with respect to processing block 620, two filters are used to band pass the source signals and these are then used in processing block 630 to compute the intermodulation products estimate.

In processing block 635, the intermodulation compensator applies a band pass filter to the signal estimates of the in-band interference to produce an estimate of the in-band interfering signals (by passing an interfering signal having the same frequency band pass as the desired signal).

In processing block 640, the intermodulation compensator inverts the estimate of the interfering signal set (processing block 640) and adds the inverted interfering signal set to the original desired signal to cancel the interfering signals (processing block 645).

Also, in processing block 650, the intermodulation compensator cross correlates the inverted estimate of the interfering signal added to the desired signal with a zero forcing (or other adaptive) algorithm until the cross correlation is reduced, and potentially reaches a minimum. Also in processing block 650 determines the phase and amplitude offsets and passes them to processing block 655.

In processing block 655, the intermodulation compensator adjusts the phase and/or amplitude of the estimated interference signals with a zero forcing (or other adaptive) algorithm and generates a signal to control generation of the invert cancellation signal. The control loop may run continuously to adaptively cancel the in-band interfering signals.

This system may be applicable to any communications system including those with close in-interfering signals and in-band intermodulation products. The technique described above may be implemented as a set of instructions to be executed and stored in the memory of a computer system (e.g., set top box, video recorders, etc.).

Alternatively, the logic to perform the methods as discussed above, could be implemented by additional computer and/or machine readable media, such as discrete hardware components as large-scale integrated circuits (LSI's), application-specific integrated circuits (ASIC's), firmware such as electrically erasable programmable read-only memory (EEPROM's); and electrical, optical, acoustical and other forms of propagated signals (e.g., carrier waves, infrared signals, digital signals, etc.); etc.

Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

Figure 7:
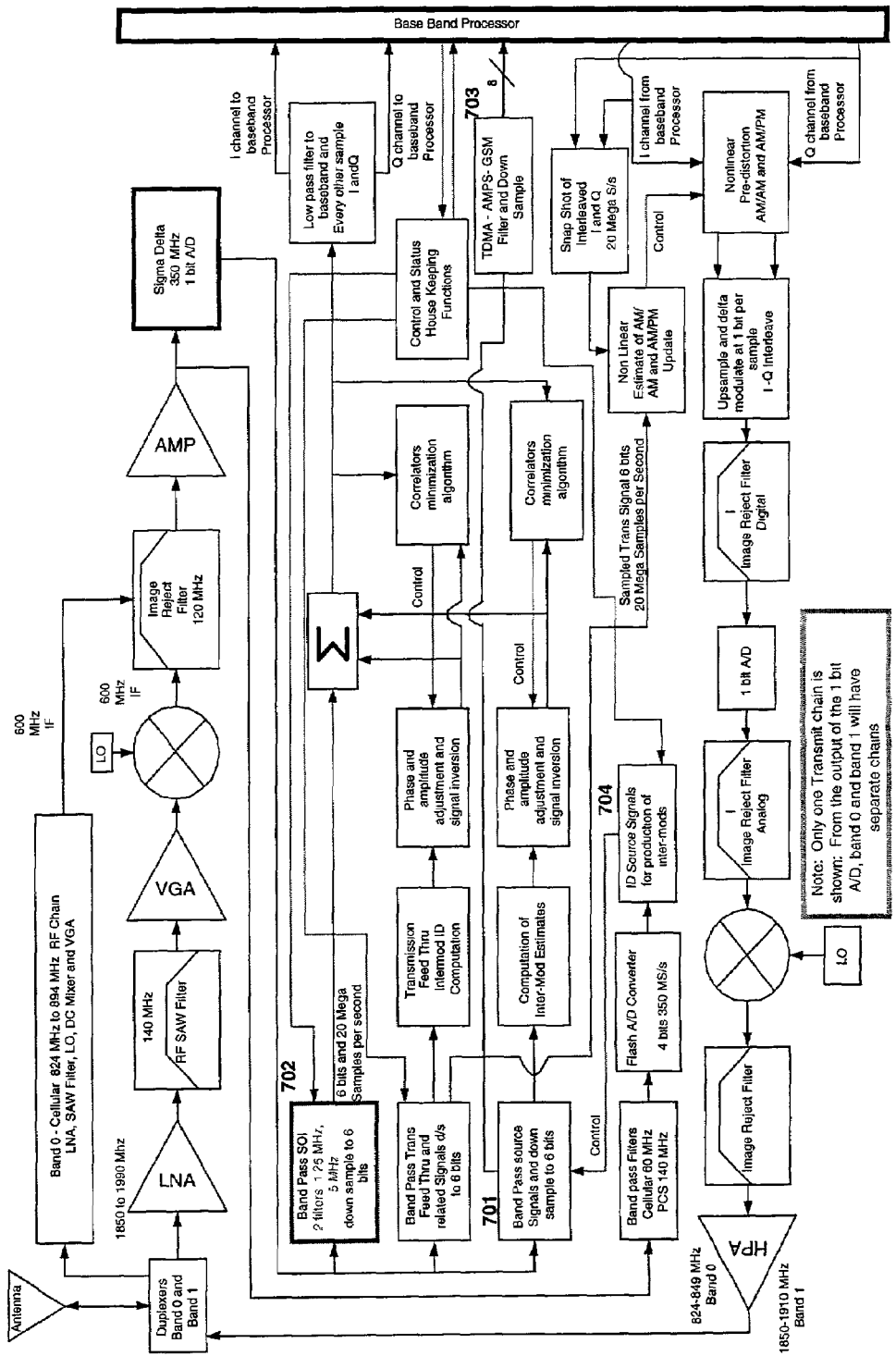
FIG. 7 illustrates a block diagram of one embodiment of a receiver in which multiple mobile telephony standards supported include CDMA2000, AMPS, TDMA, GSM and 3G WCDMA.

FIG. 7 is a block diagram of another embodiment of the receiver which is a variation on the embodiment shown in FIG. 5. Referring to FIG. 7, the architecture is capable of processing several different modes or standards in the North American telephony bands to include future growth to the 3G standard. This is done while maintaining backward compatibility between 3G and the other standards. This embodiment makes a single chip viable for all of the following in the two North American Telephony Bands: CDMA IS-95/98, CMDA 2000, 3G, TDMA, AMPS, GSM, GPRS, EDGE and others. In another embodiment, the telephony standards of other countries can be supported by changing the RF to IF down conversion components. In an alternative embodiment, a flash A/D converter may be used in place of the Sigma Delta Modulator and Decimating filters if the dynamic range required by CMDA and the high power jammers is not required. In either case, the entire passband of the receiver is sampled and programmable or fixed digital filters are used to isolate desired signals, and interfering signals in the CDMA, AMPS, TDMA GSM etc signal bands. The sigma delta approach affords greater resolution and dynamic range.

In FIG. 7, filter block 702 has two filters instead of one, one for the 1.25 MHz CDMA 2000 and a 5 MHz filter for the 3G. The decimating filters output 6 bits at approximately 20 Mega Samples per second for CDMA 2000 and 6 bits at approximately 80 Mega Samples per second for 3G. 3G is a CDMA signal that is 4 times the rate of CDMA 2000 and is 4 times the bandwidth.

The Sigma Delta A/D converter has a sufficiently high over sampling ratio (OSR) to provide adequate SNR for both CDMA 2000 and 3G. The Sigma Delta A/D converter has an OSR of 140 for and achieves a SNR of about of over 85 dB for a $2^{nd}$ or $3^{rd}$ order sigma delta loop. This can yield up to 14 bits if required and this is true for the source signals as well. The OSR for 3G Wideband CDMA (WCDMA) is 35 which will yield a SNR of better than 80 dB for the $3^{rd}$ order loop and better than 60 dB for the $2^{nd}$ order loop. This will yield 10 to 13 bits. In one embodiment 6 bits are used to keep computational complexity down. If more bits are required, this can be achieved in the decimating filters.

In FIG. 7, filter block 701, the decimating programmable filter that in the receiver of FIG. 5 previously used for the source interfering signals is used for TDMA or AMPS signals. The frequency of the AMPS and or TDMA can be any where in the receive band of the telephony channels. The frequency is known by the control and status function and is passed to the source signal search block 704 which passes the frequency assignment to decimation filter block 701. The filters in decimation filter block 701 are nominally 300 kHz wide. Filter block 701 outputs the signal to the AMPS/TDMA/GSM down sample and filter block 703 that comprises digital filters to filter out the narrow AMPS or TDMA signals normally 10 or 30 kHz wide. These signal are very narrow band and the sigma delta A/D converter results in a very high SNR and the number of bits output can be 10 to 14 bits if required. In one embodiment, the OSR provides adequate SNR for 14 bits, but less may be used to eliminate complexity. The previous description of the non-linear transmitter are also applicable here as shown in the FIG. 7.

In one embodiment, with respect to filter block 701, the output of the decimating filter can be a GSM signal processed in the same manner as described for the TDMA and AMPS. The GSM is 200 kHz wide and can be frequency hopped. This is readily handled by filter block 701 because it has two programmable filters (nominally 300 kHz wide) for the two source signals used to generate the intermodulation product estimate. When the receiver is used in the GSM mode, the two source signal decimating filters are used to filter the GSM signal. While one filter is being used, the other is being set to the next GSM hop frequency and is switched in at the appropriate time and then the other is set for the next frequency. The output of filter block 701 goes to filter and downsample block 703 where the final down conversion and filtering are performed for the GSM signal. Since the GSM waveform is the same for GSM, GPRS, EDGE and any other variations on GSM. The previous description of the non-linear transmitter are also applicable here as shown in the FIG. 7.

The embodiment shown in FIG. 7, a variation on FIG. 5 provides a fully programmable receiver that can demodulate known wireless telephony standards. A minor difference exists at the RF front end where all bands (Europe, Asia, Japan, China, Korea, North America etc.) are down converted to one convenient IF and then they are all processed by the architecture described herein. The upper path is just an example for the North American cellular band.

Figure 8:
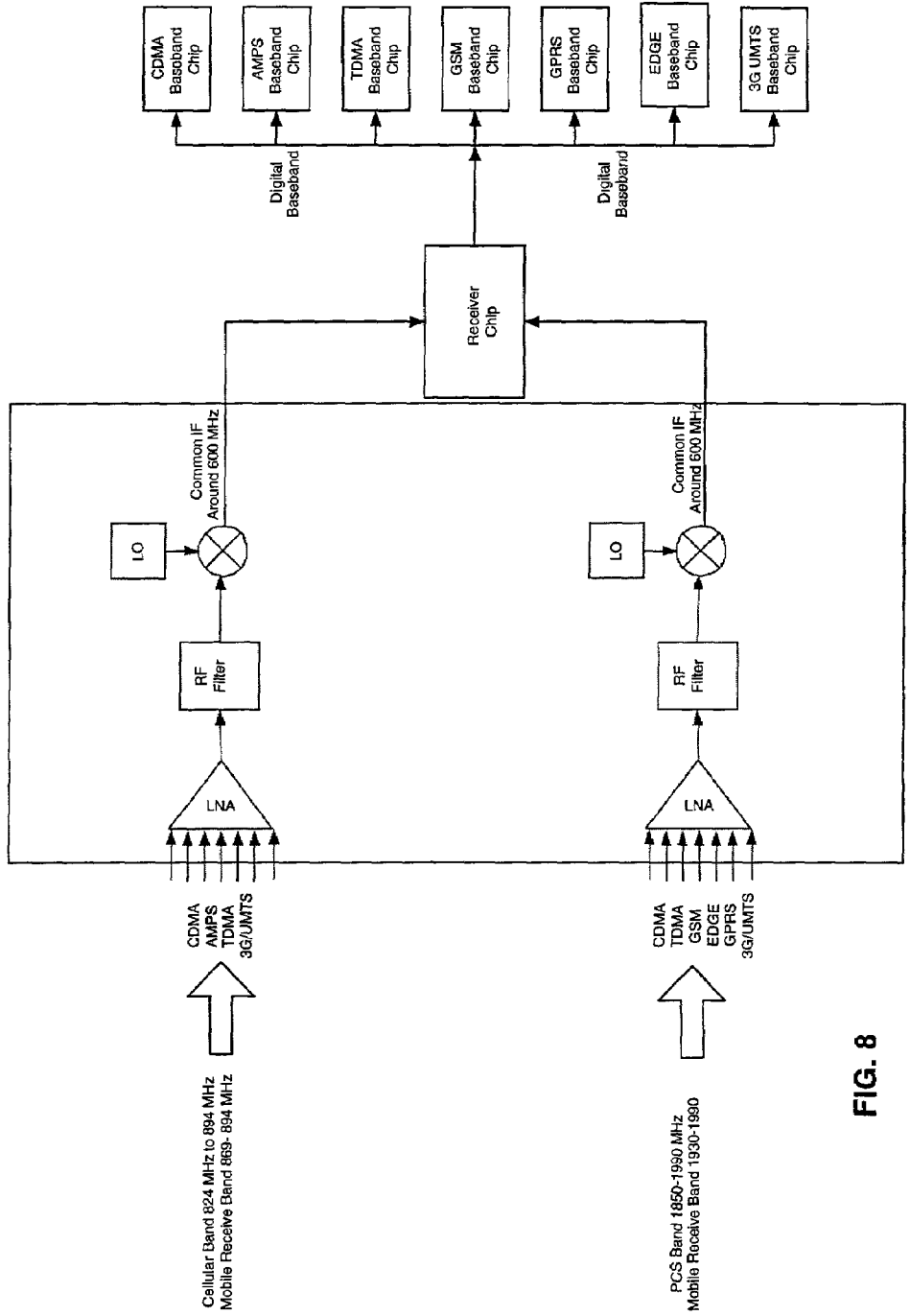
FIG. 8 illustrates a block diagram of on e embodiment of a receiver showing the relationship with multiple vendors' baseband processors for multi-standard mobile telephony.

FIG. 8 shows the topology of the multi-standard architecture for the North American Telephony bands. In other embodiments, various RF bands can be processed. CMDA, AMPS, GSM, TDMA, and 3G/UMTS with forward and backward compatibility are provided with this embodiment.

Note that the analog BNA, mixer and LO may be integrated on the same integrated circuit as the receiver.

Figure 9:
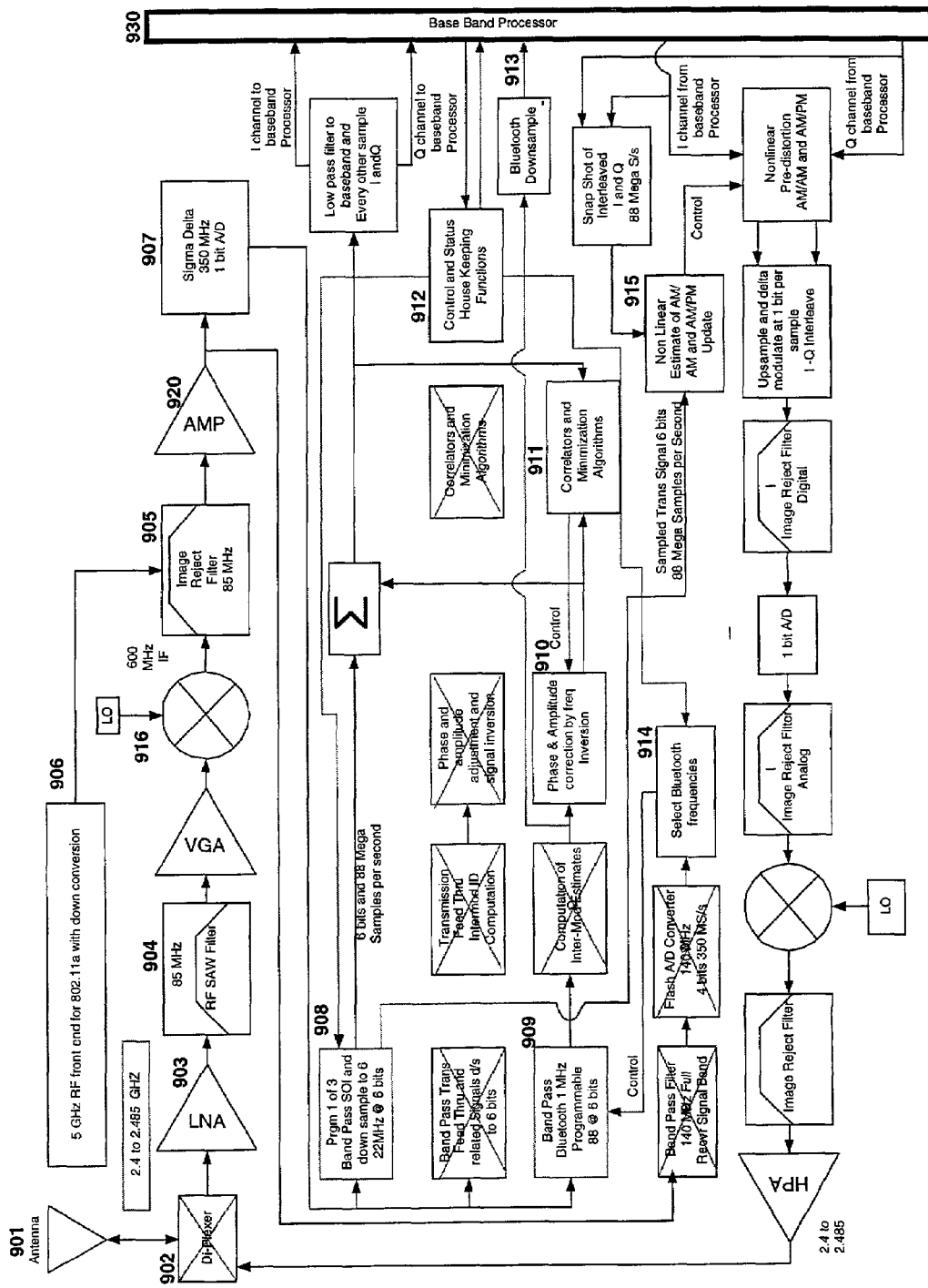

FIG. 9 shows another embodiment of the receiver in which wireless LAN 802.11b and Bluetooth are processing simultaneously while mitigating the interference of Bluetooth on 802.11b. This embodiment also supports 802.11a.

The embodiment shown in FIG. 9 is a reduced version of FIG. 7 and FIG. 5 with a few changes to accommodate the 22 MHz wide 802.11b signals. The x-ed out boxes show which boxes in FIG. 7 are not required for this application, showing the multi-mode capability of architecture.

Figure 10:
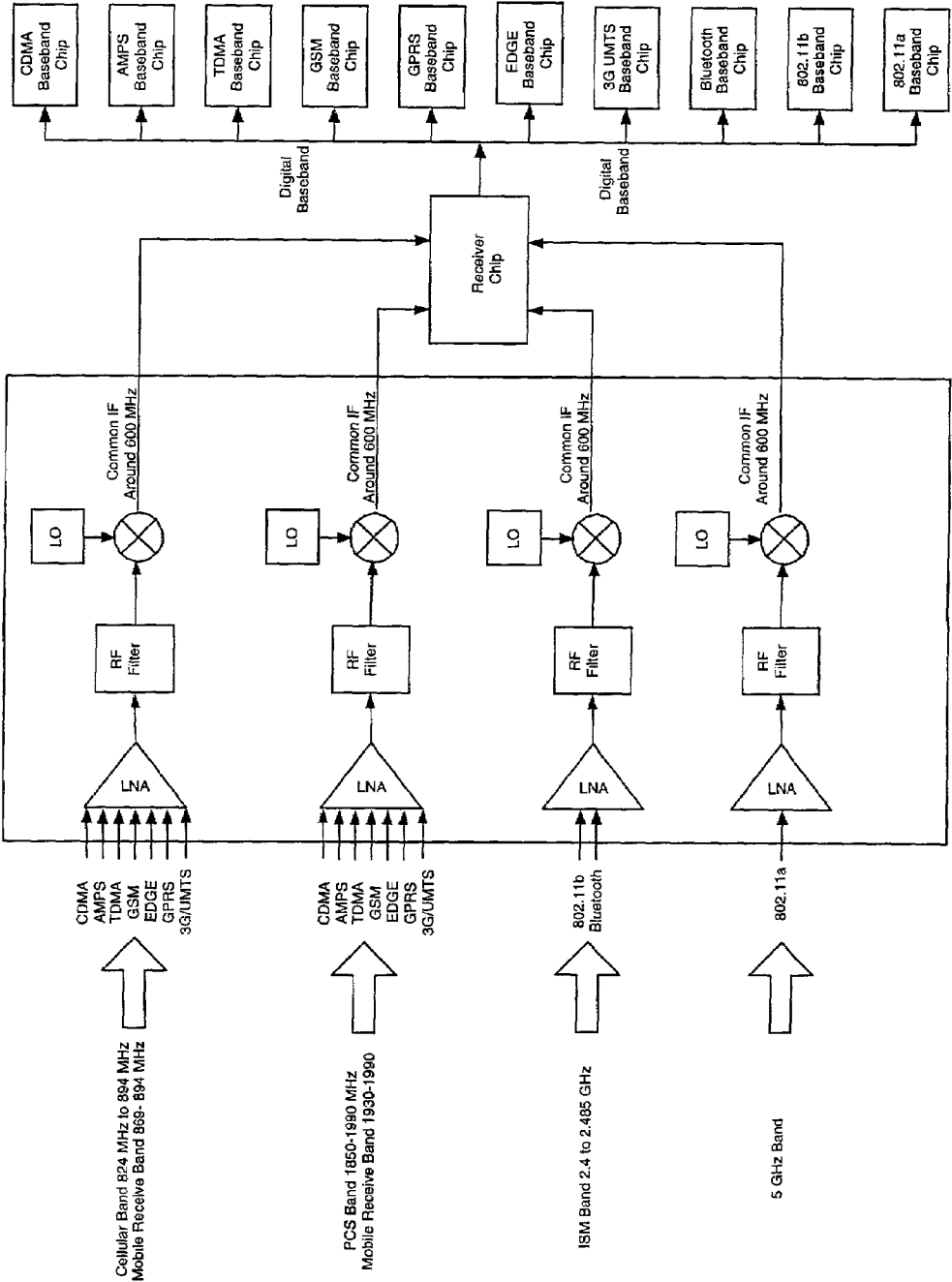
FIG. 10 illustrates a block diagram of one embodiment of a receiver showing the relationship with multiple baseband processors for multi-standard mobile telephony as well as the WLAN and PAN.

Thus, FIG. 9 becomes a functional subset of FIG. 7. The ISM band is 85 MHz wide and it contains both the 802.11b and the Bluetooth signals. The operation of the functional block here are the same as discussed above. The 802.11b signal of interest (SOI) is processed in filter block 908 as discussed above only with a different bandpass filter in the decimating filter. The Bluetooth signal is a frequency hopped signal and is 1 MHz wide and is used directly (i.e. intermodulation products are not computed) to cancel out the Bluetooth interference in the 802.11b signal. The Bluetooth signal is narrowband filtered in the decimating filter 909 and is sent to phase and amplitude correction unit 910 for interference cancellation support and to Bluetooth downsample unit 913 for final down conversion and processing by the Bluetooth baseband processor. When 802.11a is being processed, the cancellation path is dormant and 802.11a is processed via filter in filter unit 908. FIG. 9 is a subset of FIG. 7 with a few minor modifications. This embodiment allows for the embodiment shown in FIG. 7 to include the WLAN and PAN for a single receiver that can process all of the telephony standards as well as the WLAN and PAN (802.11a, b and Bluetooth). This is shown in FIG. 10.

In FIG. 9, the antenna 901 receives the RF signal for the band of interest. While not shown in the diagram, one or more antennas may be present for the two bands at 2.4 GHz (ISM band for 802.11b and Bluetooth) and the 5 GHz for the 802.11a. In one embodiment, duplexer 902 is not required since these standards are not full duplex. It would be included for embodiments where in the systems are full duplex. The output of antenna 901 or duplexer 902 is sent to LNA 903 and SAW filter 904 and then to down converting mixer 916. The output of down converting mixer 916 is then filtered by image reject filter 905 to reject unwanted mixing products from the down conversion process. Down conversion unit 906 performs the equivalent functions as LNA, SAW filter 904, the VGA, 903 thru down converting mixer 916 only for the 5 GHz band. The output of down converter 906 is at the same IF as that for the other band and it is filtered by image reject filter 905 to eliminate unwanted mixing products.

The output of image reject filter 905 is amplified by an amplifier 920 and forwarded to Sigma Delta Modulator 907. The output of Sigma Delta Modulator 907 is sent to filters 908 and 909, which are the decimating filters. If higher bit resolution is required, the sigma delta sampling can be increased to a higher rate. In another embodiment, Sigma Delta Modulator 907 and decimating filters 908 and 909 may be replaced by a high speed flash A/D converter followed by programmable or fixed digital filters in filters 908 and 909 Either way, the entire receive band is digitized and high resolution samples of the 802.11b and the Bluetooth signals result (probably 4 to 6 bits). Other embodiments may have greater resolution. The Bluetooth signal is frequency hopped and the two source signal filters in filter 909 are alternately used and programmed for the next frequency hop.

In FIG. 9, the 802.11b and the Bluetooth signals are derived from same digital samples and this aids greatly in keeping the signals aligned for the cancellation functions. The Bluetooth signal is 1 MHz wide and the 802.11b is 22 MHz wide. If the signal in the 1 MHz passband of the Bluetooth signal is cancelled out, the 802.11b signal suffers a 0.2 dB loss in signal strength. The Bluetooth signal, in 1 MHz, can have a power level comparable to that of the 802.11b in 22 MHz, which means without the Bluetooth mitigation the 802.11b will see around a 0 to 5 dB SNR after dispreading. The Bluetooth cancellation will result in a 0.2 dB reduction in the SNR of the 802.11b which is a very manageable reduction yielding an 802.11b SNR that is only 0.2 dB less than that which would be seen in the absence of Bluetooth.

The output of 909 is sent to phase and amplitude correction unit 910 and downsample unit 913. In downsample 913, the Bluetooth signal is down converted and filtered for output to and processing in the Bluetooth baseband processor 930. The signal sent to correction unit 910 is corrected for phase and amplitude for the given hop frequency such that the correlation in 911 is reduce, and potentially minimized, as discussed above. This embodiment does not require any special interfaces and or coordination with the Bluetooth and 802.11b baseband processors, so this will work with any vendor's processor.

Correlation unit 911 receives a copy of the 802.11b signal after the Bluetooth cancellation has taken place. Correlation unit 911 also receives copy of the Bluetooth signal and computes the cross correlation of this signal and 90 degree shifted version and using a dither algorithm determines phase and amplitude adjustment to be made in phase and amplitude correction unit 910 such that the residual Bluetooth signal in the 802.11b is reduced, and potentially minimized. The Bluetooth signal used up to 79 frequencies in the ISM band and it is reasonable to assume that each frequency might require a different phase and amplitude adjustment to optimize the cancellation of the Bluetooth signal in the 802.11b signal. To accommodate this, phase and amplitude 910 maintains a continuously updated table of the phase and amplitude adjustments required to reduce the residual Bluetooth signal. These table values are constantly updated by inputs from correlation unit 911.

In one embodiment, a SAW IF filter is used to increase the dynamic range of the receiver is the presence of high power blocking signals.

Figure 13:
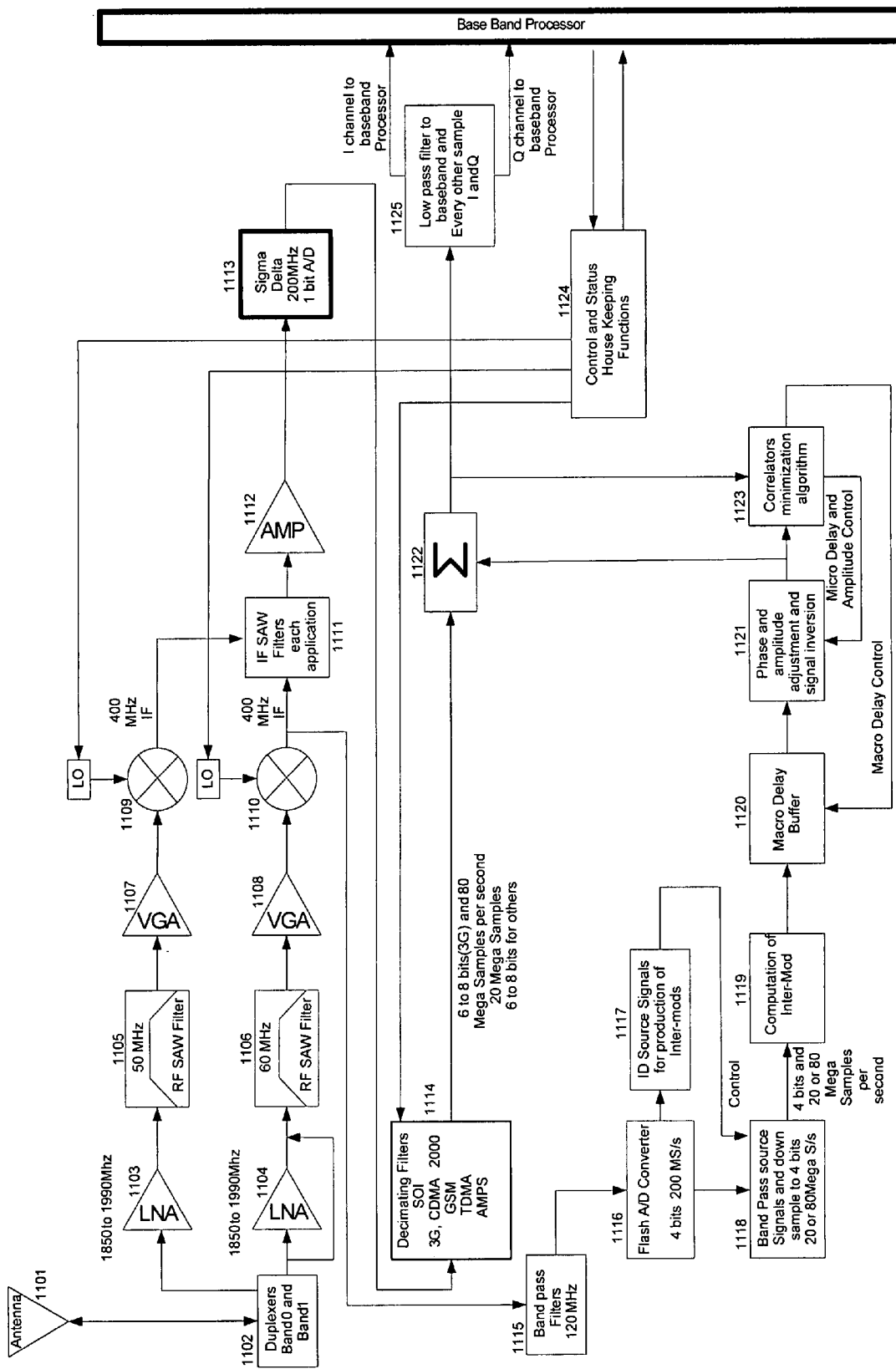
FIG. 13 is a block diagram of one embodiment of a receiver having Quad-Mode Dual Band IF Sampling with an IF Filter.

One embodiment of a receiver, with an IF filter to improve dynamic range, is shown in FIG. 13. This receiver is 3G compatible. When the jammer signals are high amplitude relative to the signal of interest, the amplitude of the jammer (blocking signals) is reduced prior to the sigma delta converter if the sampling is to be done at an IF frequency. The maximum dynamic range could be limited to around 50 to 55 dB. The reason for this is that it is difficult to get a SNR greater than 50 or 55 dB at IF. When the signal of interest is as low as −116 dm and the blocking tone is at −30 dBm, the A/D conversion process requires a SNR of around 86 to 90 dB to be able to filter out the blocking signal and retain the signal of interest. When this is the case, an IF filter (in one embodiment a SAW filter) can reduce the blocking signal by 35 to 40 dB. At this point, the sigma delta can be used to sample the filtered signal and get the 50 to 55 dB or about 9 bits.

Referring to FIG. 13, the source signals are no longer available in the digital sample from the sigma delta and is derived from another source.

Antenna 1101 receives a signal that is sent to duplexers 1102 that separates the received signal into two bands, band 0 and band 1. Each band is sent to a separate LNA, LNA 1103 or LNA 1104. In one embodiment, LNAs 1103 and 1104 amplify their respective signals to a range of 1050-1990 MHz. The amplified signals are then filtered with RF SAW filters 1105 and 1106. In one embodiment, RF SAW filter 1105 has a passband of 50 MHz, while RF SAW filter 1106 has a passband of 60 MHz. The filtered signals output from RF SAW filters 1105 and 1106 are amplified by VGAs 1107 and 1108, respectively. The amplified signals output from VGAs 1107 and 1108 are mixed with a local oscillator using mixers 1109 and 1110 to bring the signals to an IF. In one embodiment, the output of mixers 1109 and 1110 are at a 400 MHz IF.

The outputs of mixers 1109 and 1110 are output to IF SAW filter 1111, the output of which is amplified by amplifier 1112. The output of amplifier 1112 is sent to Sigma Delta A/D 1113. In one embodiment, Sigma Delta A/D comprises a 200 MHz 1-bit A/D.

The output of Sigma Delta A/D 1113 is input to decimating filters 1114. Decimating filters 1114 operate as described above. In one embodiment, the output of decimating filters 1114 are 6 to 8 bits (for 3G) and 80 Mega samples per second, while in an alternative embodiments, the output is 20 Mega samples and 6 to 8 bits for others. The output of decimating filters 1114 is sent to summation block (cancellation block) 1122 to cancel the inbound interference as described above. The output of summation block 1122 is output to filter 1125, which low pass filters the signals to baseband and output I and Q channels to a baseband processor.

More specifically, in FIG. 11, the analog signal is split after the down converting mixer 1110 and sent to IF filter 1111 and to flash A/D converter 1116 (e.g., a 4 bit 200 MS/s flash A/D converter). In one embodiment, bandpass filter 1115 may be included (but is not necessary). In one embodiment, bandpass filter 1115 has a 60 MHz passband. Flash A/D converter 1116 over samples the entire receive passband at 3 or 4 bits at a rate higher than the Nyquist rate to avoid aliasing. The output of flash A/D converter 1116 is sent to two cells 1117 and 1118.

In one embodiment, intermods source signal identification block 1117 breaks the receive pass band into frequency blocks and computes the DFT (or the FFT) to identify the blocks in which there is sufficiently high enough energy to create intermods. This function also determines which source signals are at the required frequency spacing to create intermods which will produce intermods in the pass band of the signal of interest. Only those that can produce intermods in the passband of the signal of interests are identified for filtering.

In one embodiment, the first blocks are 3 MHz wide and those of interest are broken into 300 kHz blocks. Decimating filters 1114 that follow are nominally 300 to 400 kHz. Source signals are multiplied in the time domain to produce an estimate of the inband intermods. The estimate is filtered to the passband of the signal of interest to isolate those signals that need to be cancelled in the passband of the signal of interest.

In one embodiment, flash A/D converter 1116 receives the frequencies of the source signals and uses programmable decimating filters to isolate the source signals and increase the SNR by narrow band filtering. These signal sets are sent to intermod computation block 1119 where an estimate of the intermods is computed.

In one embodiment, Macro Delay Buffer 1120 provides for delays of up to some number of samples to perform an approximate phase shift to account for any differences in the delay between the signal of interest path and the intermod generate path. The micro delay is done at the sub-sample level in phase and amplitude adjustment block 1121.

In one embodiment, a calibration pulse is generated when the receiver is powered up to set the macro delay and then a phase adjustment is controlled by the correlators 1123. In one embodiment, correlators 1123 use a minimization algorithm in a manner well-known in the art. After this point, the processing is in the receiver embodiments described above without the IF filters.

What is claimed is:

1. A method comprising:
over-sampling, at a desired frequency, a passband of received signals to create a bit stream, wherein the received signals include signals of interest and interference generating signals, the interference generating signals capable of generating intermodulation products inband of the signals of interest;
isolating signals of interest in the bit stream using one or more decimating filters;
isolating source signals that generate one or more intermodulation products inband of the signal of interest using one or more decimating filters;
computing an estimate of each of the one or more intermodulation products from the source signals that generate the one or more intermodulation products;
cancelling out one or more inband intermodulation products using the estimate of the intermodulation products; and
performing phase and amplitude adjustment on estimations of the intermodulation product interfering signals in a closed loop manner, wherein performing phase and amplitude adjustment of the estimations comprises performing sub-sample phase shifts to make a phase adjustment on the estimations of the intermodulation product interfering signals.

2. An apparatus comprising:
means for over-sampling, at a desired frequency, a passband of received signals to create a bit stream, wherein the received signals include signals of interest and interference generating signals, the interference generating signals capable of generating intermodulation products inband of the signals of interest;
means for isolating signals of interest in the bit stream using one or more decimating filters;
means for isolating source signals that generate one or more intermodulation products inband of the signal of interest using one or more decimating filters;
means for computing an estimate of each of the one or more intermodulation products from the source signals that generate the one or more intermodulation products;
means for canceling out one or more inband intermodulation products using the estimate of the intermodulation products; and
means for performing phase and amplitude adjustment on estimations of the intermodulation product interfering signals in a closed loop manner, wherein the means for performing phase and amplitude adjustment of the estimations comprises means for performing sub-sample phase shifts to make a phase adjustment on the estimations of the intermodulation product interfering signals.

3. An apparatus comprising:
a sampling unit to sample, at a desired frequency, a passband of received signals to create a bit stream, wherein the received signals include signals of interest and interference generating signals, the interference generating signals capable of generating intermodulation products inband of the signals of interest;
one or more filters to isolate signals of interest and interfering signals in the bit stream;
a cancellation unit to cancel out isolated interference generated signals using estimations of the intermodulation products generated by the isolated interfering signals, wherein the estimations of the isolated interfering signals comprise estimations of intermodulation products falling inband of the signals of interest; and a phase and amplitude adjuster to adjust the phase and amplitude of estimations of the isolated interfering signals in a closed loop manner, wherein the phase and amplitude adjuster performs phase and amplitude adjustment of the estimations by making sub-sample phase shifts to make a phase adjustment on the estimations of the isolated interfering signals.

4. A method comprising:

outputting a pair of identical digital samples from a sigma delta analog to digital converter (ADC) after sampling an intermediate frequency signal with the sigma delta ADC;

applying a first decimating filter to one of the pair to perform a bandpass operation to obtain a signal of interest with in-band interference intermodulation products, wherein the first decimating filter comprises a finite impulse response (FIR) filter;

applying a second decimating filter to the other pair to perform a band reject operation for the signal of interest to create out of band signals that are a source of the in-band interference intermodulation products, wherein the second decimating filter comprises a FIR filter;

generating an estimate of in-band intermodulation interference based on the out of band signals; and adding an inverted version of the estimate of in-band intermodulation interference to the signal of interest having the in-band interference intermodulation products to cancel interference caused thereby and create a resulting signal, wherein the first and second FIR filters are applied at a rate at which the sigma delta ADC is applied.

5. A method comprising:

outputting a pair of identical digital samples from a sigma delta analog to digital converter (ADC) after sampling an intermediate frequency signal with the sigma delta ADC;

applying a first decimating filter to one of the pair to perform a bandpass operation to obtain a signal of interest with in-band interference intermodulation products;

applying a second decimating filter to the other pair to perform a band reject operation for the signal of interest to create out of band signals that are a source of the in-band interference intermodulation products;

generating an estimate of in-band intermodulation interference based on the out of band signals, wherein generating an estimate of in-band interference is based on second and third order input intercept points (IIP2 and IIP3); and adding an inverted version of the estimate of in-band intermodulation interference to the signal of interest having the in-band interference intermodulation products to cancel interference caused thereby and create a resulting signal.

6. The method defined in claim 5 further comprising continuously generating updated IIP2 and IIP3 values.

7. The method defined in claim 5 wherein generating an estimate of in-band interference is further based on other non-linear attributes.

8. further A method comprising:

outputting a pair of identical digital samples from a sigma delta analog to digital converter (ADC) after sampling an intermediate frequency signal with the sigma delta ADC;

applying a first decimating filter to one of the pair to perform a bandpass operation to obtain a signal of interest with in-band interference intermodulation products;

applying a second decimating filter to the other pair to perform a band reject operation for the signal of interest to create out of band signals that are a source of the in-band interference intermodulation products;

generating an estimate of in-band intermodulation interference based on the out of band signals;

adding an inverted version of the estimate of in-band intermodulation interference to the signal of interest having the in-band interference intermodulation products to cancel interference caused thereby and create a resulting signal; and cross-correlating the resulting signal with the estimate of the in-band interference.

9. The method defined in claim 8 further comprising:

adjusting phase and amplification of the inverted estimate of the in-band interference prior to adding the inverted estimate of in-band inter-modulation interference to the signal of interest.

10. The method defined in claim 9 wherein adjusting phase and amplitude of the inverted estimate of the in-band interference is controlled by an adaptive algorithm to produce results of cross-correlating the resulting signal with the estimate of the in-band interference.

11. The method defined in claim 10 wherein the adaptive algorithm is a zero forcing minimizing algorithm.

12. The method defined in claim 11 wherein the minimizing algorithm comprises a zero forcing algorithm.

13. An apparatus comprising:

a converter to generate a pair of identical bit streams, wherein the bit stream comprises a flash analog to digital converter (ADC) 4 bit low resolution bit stream used to search the receive band for source signals and generate the estimates of the intermodulation products;

at least one decimating filter coupled to the converter to filter the bit streams from an intermediate frequency (IF) signal prior to application of a digital down conversion, wherein the IF filter reduces out of band blocking signals prior to converter;

a lowpass filter coupled to the decimating filter to filter the digital samples output from the decimating filter;

an in-band interference compensation unit coupled to the lowpass filter; and a second module to pass the frequency bands with source signals to a filter function, wherein the low resolution bit stream from the flash ADC is narrow-band filtered to isolate the source signals with fairly wide filters.

14. The apparatus of claim 13 wherein the filter function provides on the order of 5 to 10 times the width of the source signals.

15. The apparatus of claim 14 wherein the in-band interfere compensation unit multiplies isolated source signals together in the time domain to generate estimates of the intermodulation products and filters the result to pass only those intermodulation products that fall inband of the signal of interest.

16. The apparatus of claim 15 wherein only those frequency blocks with source signals, with such as relationship as to generate intermodulation products inband of the signal of interest, are isolated and filtered and used to generate inter modulation product estimates.

17. The apparatus of claim 15 wherein the compensation unit delays the estimates of the intermodulation products by full samples for a macro adjustment of the phase.

18. The apparatus of claim 15 wherein the compensation unit delays the estimates of the intermodulation products on a sub-sample basis for a micro adjustment of the phase.

19. The apparatus of claim 15 wherein the compensation unit continually updates the phase and amplitude of the intermodulation estimate and the estimates of the input intercept points (IIP2 and IIP3).

20. A method comprising:
receiving a signal comprising a signal of interest and one or more source signals;
generating a sampled data stream by oversampling the received signal over a receiver bandwidth at a low resolution;
recovering one or more of the source signals from the sampled data stream;
using a digital process to estimate an intermodulation product in real time using the one or more recovered source signals;
generating an intermodulation cancellation signal in real time from the estimate of the intermodulation product; and
using the intermodulation cancellation signal to cancel the intermodulation product in a bandwidth of the signal of interest.

21. The method of claim 20, wherein recovering the one or more source signals from the sampled data stream comprises:
copying the sampled data stream;
filtering the copies of the sampled data stream with a plurality of programmable passband filters.

22. The method of claim 20, wherein the one or more source signals are recovered by sampling a full passband of the receiver at radio frequency (RF), intermediate frequency (IF), or baseband (BB) using a flash analog to digital converter.

23. The method of claim 20, wherein the one or more source signals are recovered by sampling a full passband of the receiver at radio frequency (RF), intermediate frequency (IF), or baseband (BB) using a sigma delta analog to digital converter.

24. The method of claim 20, wherein the intermodulation cancellation signal is generated using a digital process comprising multiplying, sample by sample, two or more recovered source signals.

25. The method of claim 20, wherein the intermodulation cancellation signal phase and amplitude are adjusted in real time to improve intermodulation product cancellation within a passband of the signal of interest.

26. The method of claim 21, further comprising recovering the signal of interest from the first sampled stream.

27. The method of claim 21, further comprising:
generating a second sampled stream by sampling a second passband of the receiver at a second sampling rate and filtering the resulting second signal with the plurality of programmable passband filters; and
recovering the signal of interest from the second sampled stream.

28. The method of claim 20, further comprising:
filtering the intermodulation cancellation signal to retain only intermodulation products that fall within a passband of the signal of interest.

29. The method of claim 20, further comprising:
cross-correlating the intermodulation cancellation signal with the signal of interest after the cancellation process to determine a residual intermodulation interference; and
improving cancellation by adjusting the intermodulation cancellation signal phase and amplitude based on the residual intermodulation interference.

30. The method of claim 29, further comprising forcing the residual intermodulation interference to approach a minimum.

31. The method of claim 20, further comprising:
updating the estimate of the intermodulation product; and
adapting the intermodulation cancellation signal using the updated estimate of the intermodulation product.

32. The method of claim 20, wherein cancellation of intermodulation products is achieved without substantially changing an energy of the signal of interest.

33. The method of claim 20, wherein a source signal is transmitter feed thru.

34. The method of claim 21, further comprising:
searching the first sampled stream with a fast search algorithm;
identifying frequencies of the source signals; and
using the identified frequencies to predict intermodulation products within a bandwidth of the signal of interest.

35. The method of claim 34, wherein the fast search algorithm is a fast Fourier transform.

36. The method of claim 34, wherein the fast search algorithm is a discrete Fourier transform.

37. The method of claim 34, further comprising:
generating a control signal based on the identified frequencies;
sending the control signal to the programmable passband filters;
adjusting the programmable passband filters based on the control signal; and
recovering the source signals.

38. The method of claim 34, further comprising:
sub-sampling and re-sampling the intermodulation cancellation signal; and
time-aligning the intermodulation cancellation signal and the predicted intermodulation products.

39. The method of claim 21, further comprising filtering hopped signals with programmable digital filters to pass the hopped signals in different portions of the receive band.

40. The method of claim 21, further comprising frequency hopping the intermodulation cancellation signal to align the intermodulation cancellation signal with at least one of the signal of interest and the intermodulation product, wherein at least one of the source signals or the signal of interest is frequency hopped.

41. A receiver comprising:
a sampling rate multiplier to sample an analog signal using an oversampling ratio;
a first finite impulse response (FIR) filter to pass a bandwidth of a signal of interest;
a second FIR filter to reject the bandwidth of the signal of interest;
a first downsampler to downsample a first signal to a sampling frequency;
a second downsampler to downsample a second signal to the sampling frequency; and
an intermodulation compensator,
wherein:
the first FIR filter is coupled to the sampling rate multiplier and to the first downsampler;
the second FIR filter is coupled to the sampling rate multiplier and to the second downsampler; and
the first and second downsamplers are coupled to the intermodulation compensator.

42. The receiver of claim 41, wherein the oversampling ratio of the sampling rate multiplier is between 8 and 100.

43. The receiver of claim 41, wherein the sampling rate multiplier comprises a sigma delta analog to digital converter.

44. The receiver of claim 41, wherein the sampling rate multiplier comprises a flash analog to digital converter.

45. The receiver of claim 41, wherein the sampling rate multiplier is operable to sample the full passband of the receiver at radio frequency (RF), intermediate frequency (IF), or baseband (BB).

46. The receiver of claim 41, wherein the tap weights of each FIR filter are programmable.

47. The receiver of claim 41, wherein the intermodulation compensator is operable to receive a number bit streams from the sampling rate multiplier equal to a number of source signals to be compensated.

48. An intermodulation compensator comprising:
   a processor to accept an input signal and to compute expected in-band interfering signals based on second order and third order input intercept points (IIP2 and IIP3) for a receiver;
   a finite impulse response (FIR) filter to pass intermodulation products in a bandwidth of a signal of interest;
   an adjuster to adjust an intermodulation cancellation signal phase and amplitude;
   an inverter to invert the intermodulation cancellation signal; and
   an adder to add the inverted intermodulation cancellation signal to another signal,
   wherein:
   the processor is coupled to the FIR filter;
   the controller is coupled to the FIR filter and to the inverter; and
   the adder is coupled to the inverter.

49. The intermodulation compensator of claim 48, wherein the adjuster has an input for a control signal.

50. The intermodulation compensator of claim 49, further comprising:
   a correlator coupled to the adder output and to the adjuster; and
   an adaptive algorithm calculator coupled to the adjuster and to the correlator, wherein the adaptive algorithm calculator is operable to generate the control signal.

51. The intermodulation compensator of claim 50, wherein the adaptive algorithm calculator includes logic to execute an adaptive algorithm to compute the control signal.

52. The intermodulation compensator of claim 48, wherein the processor is configured to accept input intercept point estimate updates.

* * * * *